United States Patent
Essafi et al.

(10) Patent No.: US 7,552,120 B2
(45) Date of Patent: Jun. 23, 2009

(54) METHOD FOR INDEXING AND IDENTIFYING MULTIMEDIA DOCUMENTS

(75) Inventors: Hassane Essafi, Orsay (FR); Larbi Guezouli, Gif sur Yvette (FR); Salima Sayah, Courbevoie (FR); Ali Behloul, Les Ulis (FR); Clarisse Mandridake, Villebon sur Yvette (FR); Louafi Essafi, Pantin (FR)

(73) Assignee: Advestigo, Saint Cloud (FR)

( * ) Notice: Subject to any disclaimer, the term of this patent is extended or adjusted under 35 U.S.C. 154(b) by 82 days.

(21) Appl. No.: 10/580,747

(22) PCT Filed: Nov. 25, 2004

(86) PCT No.: PCT/FR2004/003017

§ 371 (c)(1),
(2), (4) Date: Mar. 23, 2007

(87) PCT Pub. No.: WO2005/055086

PCT Pub. Date: Jun. 16, 2005

(65) Prior Publication Data

US 2007/0271224 A1    Nov. 22, 2007

(30) Foreign Application Priority Data

Nov. 27, 2003  (FR) .................................. 03 13907

(51) Int. Cl.
*G06F 17/00* (2006.01)
(52) U.S. Cl. ................. 707/7; 707/6; 707/102; 707/103; 707/104.1; 382/108; 382/154; 382/164; 382/165; 382/170; 382/176; 382/278; 382/286; 704/10; 704/201; 706/2
(58) Field of Classification Search .............. 707/2, 707/3, 4, 5, 6, 7, 102, 103 R, 103 X, 103 Y, 707/103 Z, 104.1
See application file for complete search history.

(56) References Cited

U.S. PATENT DOCUMENTS

| | | | |
|---|---|---|---|
| 5,404,299 A | * | 4/1995 | Tsurubayashi et al. ........ 704/10 |
| 5,426,708 A | * | 6/1995 | Hamada et al. ............. 382/125 |
| 5,899,999 A | * | 5/1999 | De Bonet ................. 707/104.1 |

OTHER PUBLICATIONS

"Learnable Visual Keywords for Image Classification" Joo-Hwee Lim, RWCP_Information-Base Functions KRDL Lab (Aug. 1999).*
"A robust image fingerprinting system using the Radon transform" Jin S. Seo, Science Direct—http://www.sciencedirect.com, Department of EECS, KAIST, 373-1 Guseong Dong, Yuseong Gu, Daejeon 305-701, South Korea (Jan. 11, 2004).*

(Continued)

*Primary Examiner*—Etienne P LeRoux
*Assistant Examiner*—Bruce A Witzenburg
(74) *Attorney, Agent, or Firm*—Weingarten, Schurgin, Gagnebin & Lebovici LLP

(57) ABSTRACT

The method of indexing multimedia documents comprises the following steps: a) for each document identifying and extracting terms $t_i$ constituted by vectors characterizing properties of the; b) storing terms $t_i$ in a term base comprising P terms; c) determining a maximum number N of desired concepts that group together the most pertinent terms $t_i$; d) calculating the matrix T of distances between the terms $t_i$ of the term base; e) decomposing the set P of terms $t_i$ of the term base into N portions $P_j$ ($1 \leq j \leq N$) such that $P = P_1 \cup P_2 \ldots \cup P_j \ldots \cup P_N$, each portion $P_j$ comprising a set of terms $t_{ij}$ and being represented by a concept $c_j$, the terms $t_i$ being distributed in such a manner that the terms that are farther apart are to be found in distinct portions $P_l$, $P_m$, and the terms that are closer together are to be found in the same portion $P_l$; f) structuring the concept dictionary; and g) constructing a fingerprint base made up of the set of concepts $c_i$ representing the terms $t_i$ of the documents, each document being associated with a fingerprint that is specific thereto.

23 Claims, 15 Drawing Sheets

OTHER PUBLICATIONS

Chang, Y., et al: "Conceptual retrieval based on feature clustering of documents" Proceedings of ACM SIGIR Workshop on Mathematical-Formal Methods in Information Retrieval, 'Online! Aug. 2002, pp. 1-10. Tampere, Finland. Retrieved from the Internet: URL:http://www.cacs.louisiana.edu/Publications/Raghavan/CCCK02.pdf> Retrieved on Sep. 15, 2004. Abstract; p. 3, paragraph 3; figure 1.

Diamantini, C. et al.: "A Conceptual Indexing Method for Content-Based Retrieval" Database and Expert Systems Applications, 1999. Proceedings. Tenth International Workshop on Florence, Italy, Sep. 1-3, 1999, Los Alamitos, CA, USA, IEEE Comput. Soc., US, Sep. 1, 1999, pp. 192-197. Abstract.

Carre, M. et al: Indexation Audio: Un Etat de l'Art / State of the Art in Audio Indexing: Annales des Telecommunications—Annals of Telecommunications, Presses Polytechniques et Universitaires Romandes, Lausanne, CH, vol. 55, No. 9/10, Sep. 2000, pp. 507-525.

* cited by examiner

FIG.11
FIG.12
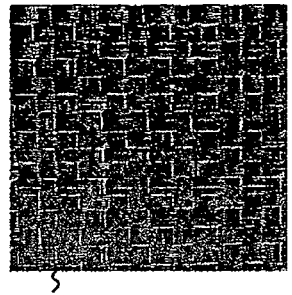
FIG.13
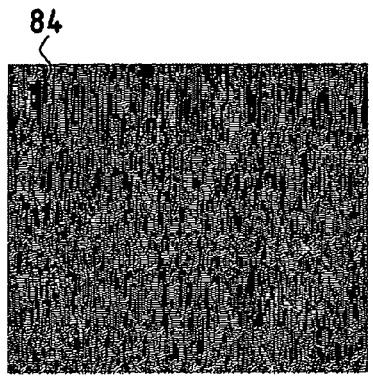
FIG.15a
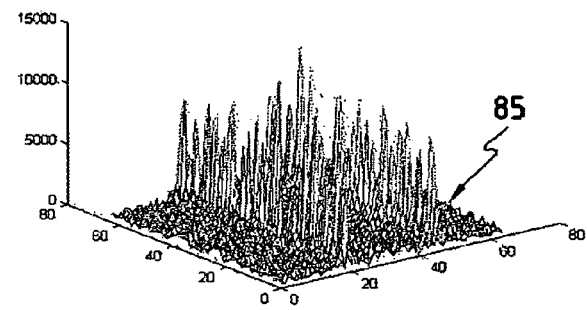
FIG.15a1
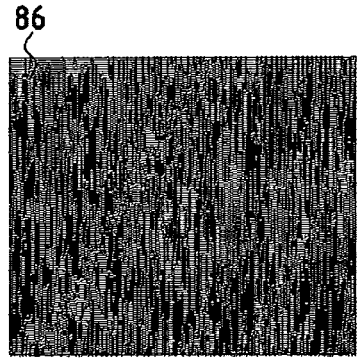
FIG.15b
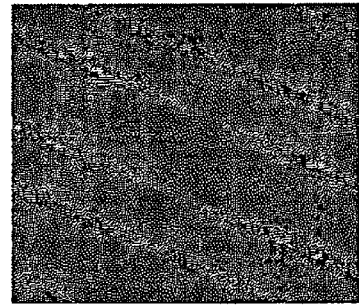
FIG.15b1
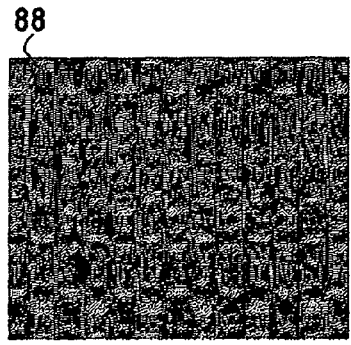
FIG.15c
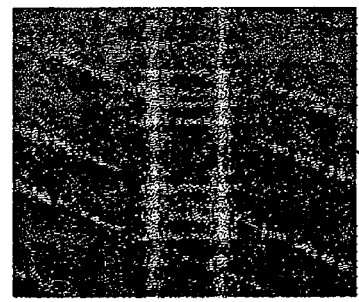
FIG.15c1

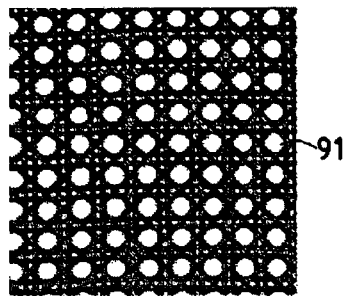
FIG.18a1
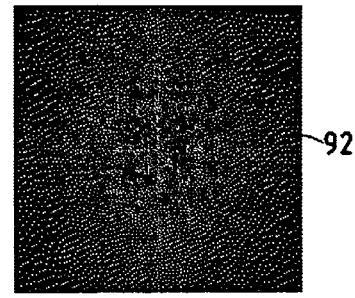
FIG.18a2
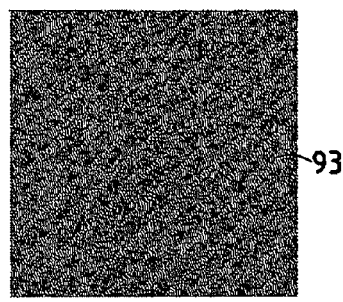
FIG.18b1
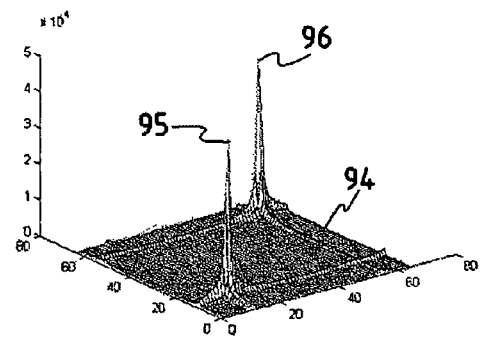
FIG.18b2
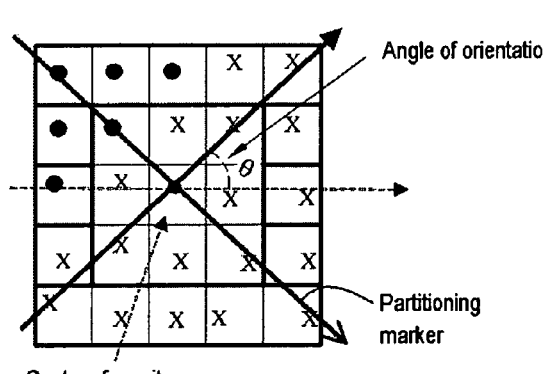
FIG.20
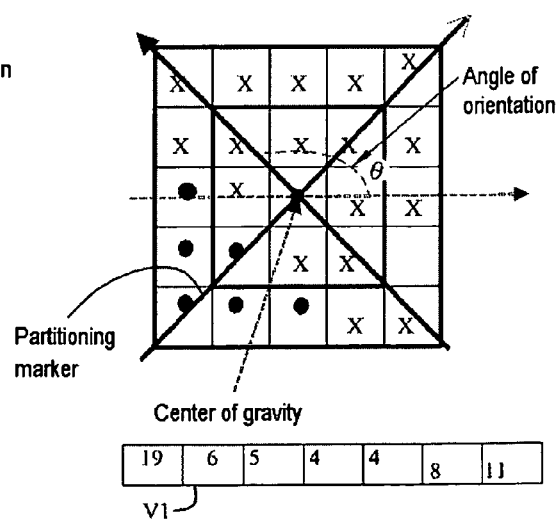
FIG.21

METHOD FOR INDEXING AND IDENTIFYING MULTIMEDIA DOCUMENTS

This application is a §371 national phase filing of PCT/FR2004/003017 filed Nov. 25, 2004, and claims priority to French application No. 0313907 filed Nov. 27, 2003.

The present invention relates to methods of indexing and identifying multimedia documents.

From a general point of view, identifying a multimedia document comprises two stages:

a so-called "indexing" stage during which attempts are made to characterize each document of a previously recorded database using a finite number of parameters that can subsequently be stored and manipulated easily; and a so-called "search" stage in which following a request made by a user, e.g. to identify a query image, a search is made for all multimedia documents that are similar or that satisfy the request.

Numerous methods already exist for indexing images that rely on extracting shape attributes from objects making up the image, if any, together with attributes for the texture or the background, of the image.

Nevertheless, known methods apply in fields that are very specialized or that involve processing a very large amount of information, thereby leading to complexity and slowness in processing the information.

The present invention seeks to remedy the above-mentioned drawbacks and to provide a method of general application for indexing and identifying multimedia documents, the method rationalizing the processing and leading to processing times that are much shorter, while increasing the quality of the results and their reliability, thus making it possible in particular to proceed with effective searches based on content.

In accordance with the invention, these aims are achieved by a method of indexing multimedia documents, the method being characterized in that it comprises the following steps:

a) for each document, identifying and extracting terms $t_i$ constituted by vectors characterizing properties of the multimedia document for indexing, such as shape, texture, color, or structure of an image, the energy, the oscillation rate or frequency information of an audio signal, or a group of characters of a text;

b) storing the terms $t_i$ characterizing the properties of the multimedia document in a term base comprising P terms;

c) determining a maximum number N of desired concepts combining the most pertinent terms $t_i$, where N is an integer less than P, with each concept $c_i$ being designed to combine all terms that are neighboring from the point of view of their characteristics;

d) calculating the matrix T of distances between the terms $t_i$ of the term base;

e) decomposing the set P of terms $t_i$ of the term base into N portions $P_j$ such that $P = P_1 \cup P_2 \ldots \cup P_j \ldots \cup P_N$, each portion $P_j$ comprising a set of terms $t_{ij}$ and being represented by a concept $c_j$, the terms $t_i$ being distributed in such a manner that terms that are farther away are to be found in distinct portions $P_l$, $P_m$ while terms that are closer together are to be found in the same portion $P_l$;

f) structuring a concept dictionary so as to constitute a binary tree in which the leaves contain the concepts $c_i$ of the dictionary and the nodes of the tree contain the information necessary for scanning the tree during a stage of identifying a document by comparing it with previously-indexed documents; and g) constructing a fingerprint base made up of the set of concepts $c_i$ representing the terms $t_i$ of the documents to be indexed, each document being associated with a fingerprint that is specific thereto.

More particularly, each concept $c_i$ of the fingerprint base is associated with a data set comprising the number of terms No. T in the documents in which the concept $c_i$ is present.

In a particular aspect of the invention, for each document in which a concept $c_i$ is present, a fingerprint of the concept $c_i$ is registered in the document, said fingerprint containing the frequency with which the concept $c_i$ occurs, the identities of concepts neighboring the concept $c_i$ in the document, and a score which is a mean value of similarity measurements between the concept $c_i$ and the terms $t_i$ of the document that are the closest to the concept $c_i$.

Advantageously, the method of the invention comprises a step of optimizing the partitioning of the set P of terms of the term base to decompose said set P into M classes $C_i$ ($1 \leq i \leq M$, where $M \leq P$), so as to reduce the distribution error of the set P of terms in the term base into N portions ($P_1, P_2, \ldots, P_N$) where each portion $P_i$ is represented by the term $t_i$ that is taken as the concept $c_i$, the error that is committed $\epsilon$ being such that $$\varepsilon = \sum_{i=1}^{N} \varepsilon_{t_i}$$

where $$\varepsilon_{t_i} = \sum_{t_j \in P_i} d^2(t_i, t_j)$$

is the error committed by replacing the terms $t_j$ of a portion $P_i$ with $t_i$.

Under such circumstances, the method may comprise the following steps:

i) decomposing the set P of terms into two portions $P_1$ and $P_2$;

ii) determining the two terms $t_i$ and $t_j$ of the set P that are the furthest apart, corresponding to the greatest distance $D_{ij}$ of the distance matrix T;

iii) for each term $t_k$ of the set P, examining to see whether the distance $D_{ki}$ between the term $t_k$ of the term $t_i$ is less than the distance $D_{kj}$ between the term $t_k$ and the term $t_j$, and if so, allocating the term $t_k$ to the portion $P_1$, and otherwise allocating the term $t_k$ to the portion $P_2$; and iv) iterating step i) until the desired number N of portions $P_i$ has been obtained, and on each iteration applying the steps ii) and iii) on the terms of the portions $P_1$ and $P_2$.

The method of the invention may be characterized more particularly in that it includes optimization starting from N disjoint portions $\{P_1, P_2, \ldots, P_N\}$ of the set P and N terms $\{t_1, t_2, \ldots, t_N\}$ representing them in order to reduce the decomposition error of the set P into N portions, and in that it comprises the following steps:

i) calculating the centers of gravity $C_i$ of the portions $P_i$;

ii) calculating errors $$\varepsilon C_i = \sum_{t_j \in P_i} d^2(C_i, t_j) \text{ and } \varepsilon t_i = \sum_{t_j \in P_i} d^2(t_i, t_j)$$

when replacing the terms $t_j$ of the portion $P_i$ respectively by $C_i$ and by $t_i$;

iii) comparing $\epsilon t_i$ and $\epsilon c_i$ and replacing $t_i$ by $C_i$ if $\epsilon c_i \leqq \epsilon t_i$; and iv) calculating a new distance matrix T between the terms $t_i$ of the term base and the process of decomposing the set P of terms of the term base into N portions, unless a stop condition is satisfied with.

$$\frac{\epsilon c_t - \epsilon c_{t+1}}{\epsilon c_t} < \text{threshold,}$$

where $\epsilon c_t$ represents the error committed at instant t.

In order to facilitate searching and identifying documents, for the purpose of structuring the concept dictionary, a navigation chart is produced iteratively on each iteration, beginning by splitting the set of concepts into two subsets, and then selecting one subset on each iteration until the desired number of groups is obtained or until a stop criterion is satisfied.

The stop criterion may be constituted by the fact that the subsets obtained are all homogeneous with small standard deviation.

More particularly, during the structuring of the concept dictionary, navigation indicators are determined from a matrix $M=[c_1, c_2, \ldots, c_N] \in \Re^{p*N}$ of the set C of concepts $c_i \in \Re^P$, where $c_i$ represents a concept of p values, by implementing the following steps:

i) calculating a representative w of the matrix M;

ii) calculating the covariance matrix $\bar{M}$ between the elements of the matrix M and the representative w of the matrix M;

iii) calculating a projection axis u for projecting the elements of the matrix M;

iv) calculating the value pi=d(u,Ci)−d(u,w) and decomposing the set of concepts C into two subsets C1 and C2 as follows:

$$\begin{cases} c_i \in C1 \text{ if } pi \leq 0 \\ c_i \in C2 \text{ if } pi > 0 \end{cases}$$

v) storing the information {u, w, |p1|, p2} in the node associated with C, where p1 is the maximum of all pi≦0 and p2 is the minimum of all pi>0, the data set {u, w, |p1|, p2} constituting the navigation indicators in the concept dictionary.

In a particular implementation, both the structural components and the complements of said structural components constituted by the textural components of an image of the document are analyzed, and:

a) while analyzing the structural components of the image:

a1) boundary zones of the image structures are distributed into different classes depending on the orientation of the local variation in intensity so as to define structural support elements of the image; and a2) performing statistical analysis to construct terms constituted by vectors describing the local properties and the global properties of the structural support elements;

b) while analyzing the textural components of the image:

b1) detecting and performing parametric characterization of a purely random component of the image;

b2) detecting and performing parametric characterization of a periodic component of the image; and b3) detecting and performing parametric characterization of a directional component of the image;

c) grouping the set of descriptive elements of the image in a limited number of concepts constituted firstly by the terms describing the local and global properties of structural support element and secondly by the parameters of the parametric characterizations of the random, periodic, and directional components defining the textural components of the image; and d) for each document, defining a fingerprint from the occurrences, the positions, and the frequencies of said concepts.

Advantageously, the local properties of the structural support elements taken into consideration for constructing terms comprise at least the support types selected from amongst a linear strip or a curved arc, the length and width dimensions of the support, the main direction of the support, and the shape and the statistical properties of the pixels constituting the support.

The global properties of the structural support element taken into account for constructing terms comprise at least the number of each type of support and the spatial disposition thereof.

Preferably, during analysis of the structural components of the image, a prior test is performed to detect whether at least one structure is present in the image, and in the absence of any structure, the method passes directly to the step of analyzing the textural components of the image.

Advantageously, in order to decompose boundary zones of the image structures into different classes, starting from the digitized image defined by the set of pixels y(i,j) where (i,j) ∈ I×J, where I and J designate respectively the number of rows and the number of columns of the image, the vertical gradient image $g_v(i,j)$ where ∈ I×J and the horizontal gradient image $g_h(i,j)$ with (i,j) ∈ I×J are calculated, and the image is partitioned depending on the local orientation of its gradient into a finite number of equidistant classes, the image containing the orientation of the gradient being defined by the equation:

$$O(i, j) = \arctan\left[\frac{gh(i, j)}{gv(i, j)}\right], \tag{1}$$

the classes constituting support regions likely to contain significant support elements are identified, and on the basis of the support regions, significant support elements are determined and indexed using predetermined criteria.

In a particular aspect of the invention, the shapes of an image of a document are analyzed using the following steps:

a) performing multiresolution followed by decimation of the image;

b) defining the image in polar logarithmic space;

c) representing the query image or image portion by its Fourier transform H;

d) characterizing the Fourier transform H as follows:

d1) projecting H in a plurality of directions to obtain a set of vectors of dimension equal to the projection movement dimension; and d2) calculating the statistical properties of each projection vector; and e) representing the shape of the image by a term $t_i$ constituted by values for the statistical properties of each projection vector.

In a particular aspect of the invention, while indexing a multimedia document comprising video signals, terms $t_i$ are selected that are constituted by key-images representing groups of consecutive homogeneous images, and concepts $c_i$ are determined by grouping together terms $t_i$.

In order to determine key-images constituting terms $t_i$, a score vector SV is initially generated comprising a set of elements SV(i) representative of the difference or similarity between the content of an image of index i and the content of an image of index i−1, and the score vector SV is analyzed in order to determine key-images which correspond to maximums of the values of the elements SV(i) of the score vector SV.

More particularly, an image of index j is considered as being a key-image if the value SV(j) of the corresponding element of the score vector SV is a maximum and the value SV(j) is situated between two minimums minL and minR, and if the minimum M1 such that M1=(|SV$_{(j)}$−minL|, |SV$_{(j)}$−minR|) is greater than a given threshold.

Returning to indexing a multimedia document comprising audio components, the document is sampled and decomposed into frames, which frames are subsequently grouped together into clips, each being characterized by a term $t_i$ constituted by a parameter vector.

A frame may comprise about 512 samples to about 2,048 samples of the sampled audio document.

Advantageously, the parameters taken into account to define the terms $t_i$ comprise time information corresponding to at least one of the following parameters: the energy of the audio signal frames, the standard deviation of frame energies in the clips, the sound variation ratio, the low energy ratio, the rate of oscillation about a predetermined value, the high rate of oscillation about a predetermined value, the difference between the number of oscillation rates above and below the mean oscillation rate for the frames of the clips, the variance of the oscillation rate, the ratio of silent frames.

Nevertheless, in alternative manner or in addition, the parameters taken into account for defining the terms $t_i$ advantageously comprise frequency information corresponding to at least one of the following parameters: the center of gravity of the frequency spectrum of the short Fourier transform of the audio signal, the bandwidth of the audio signal, the ratio between the energy in a frequency band to the total energy in the entire frequency band of the sampled audio signal, the mean value of spectrum variation of two adjacent frames in a clip, the cutoff frequency of a clip.

More particularly, the parameters taken into account for defining the terms $t_i$ may comprise at least energy modulation at 4 hertz (Hz).

Other characteristics and advantages of the invention appear from the following description of particular implementations, given as examples and with reference to the accompanying drawings, in which:

FIGS. 11 to 13 show three examples of images containing different types of elements;

FIG. 15a shows a first example of an image containing one directional element;

Figure 1:
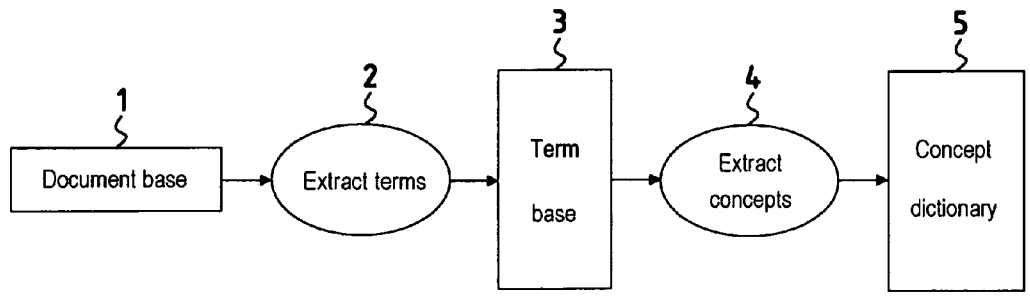
FIG. 1 is a block diagram showing the process of producing a dictionary of concepts from a document base in accordance with the invention.
Figure 2:
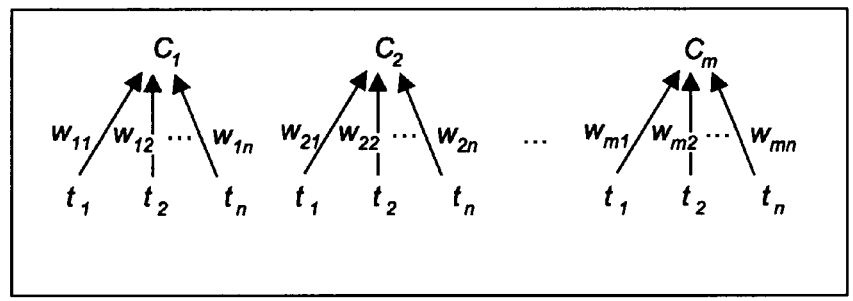
FIG. 2 shows the principle on which a concept base is built up from terms.
Figure 16:
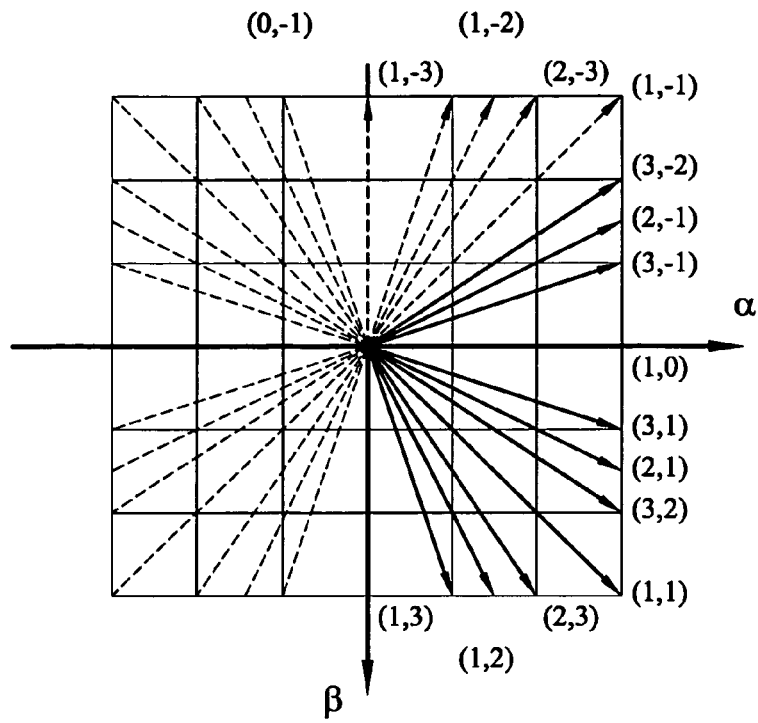
Figure 17:
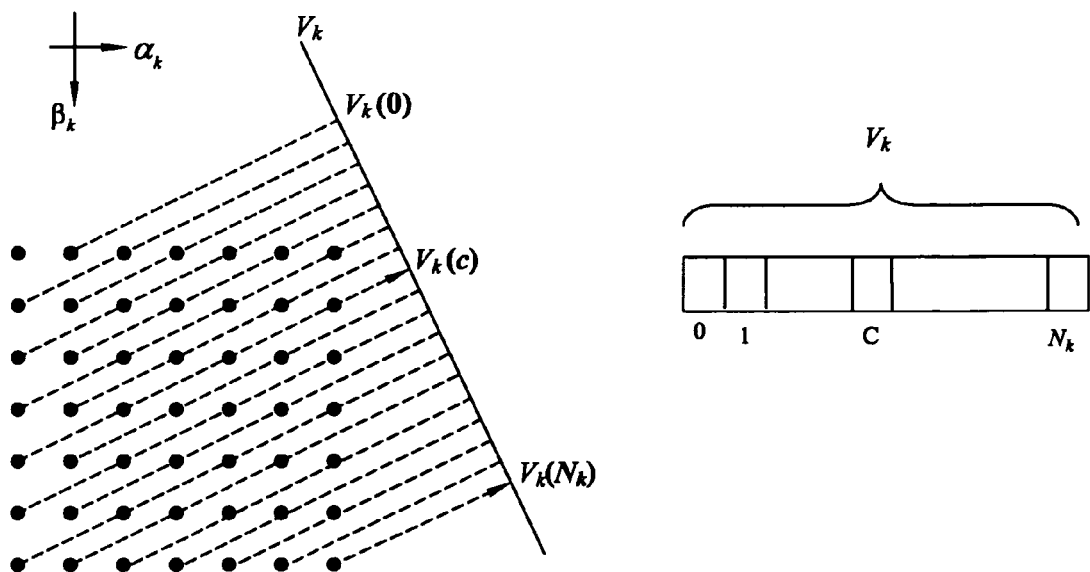
Figure 19:
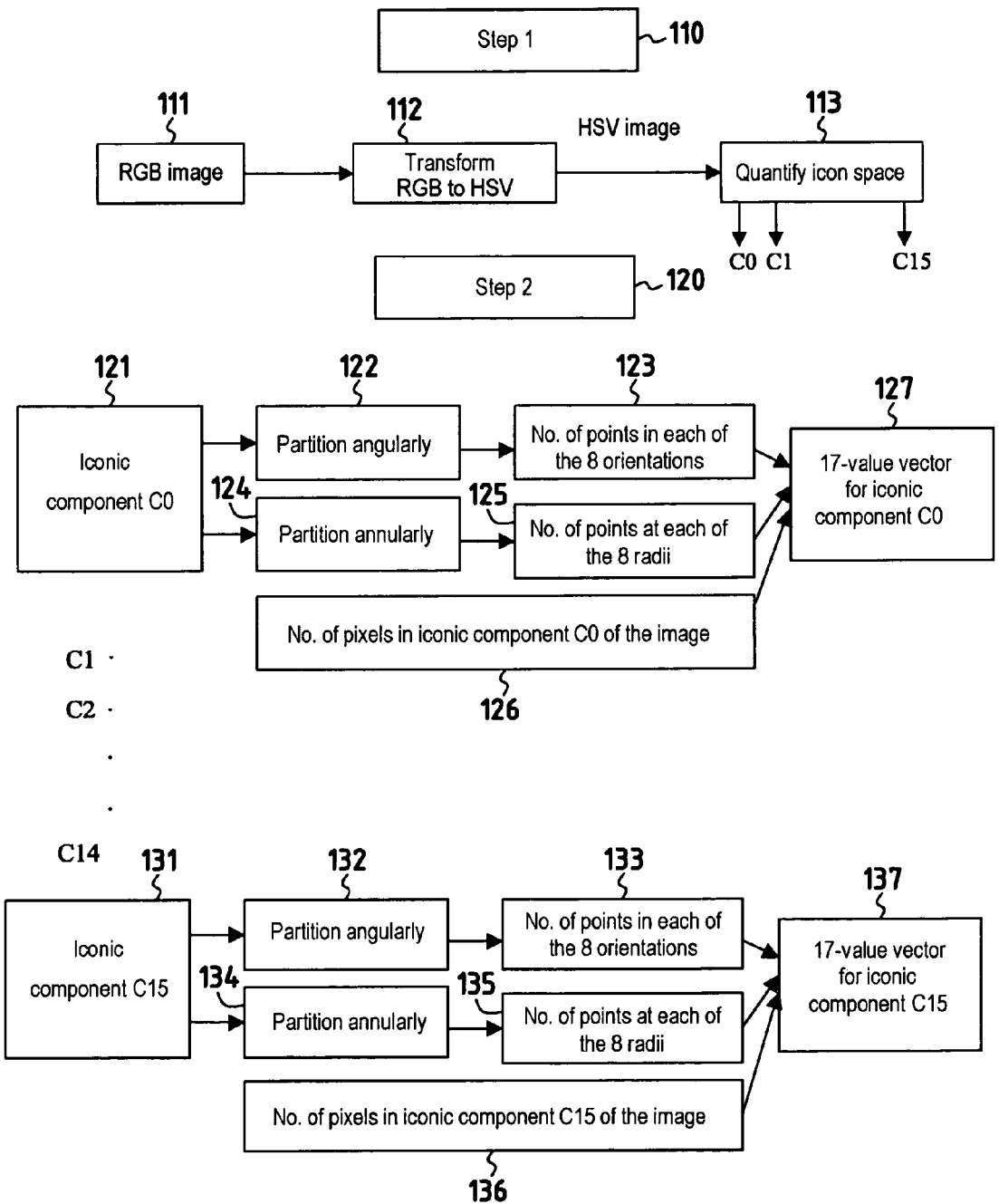
Figure 22:
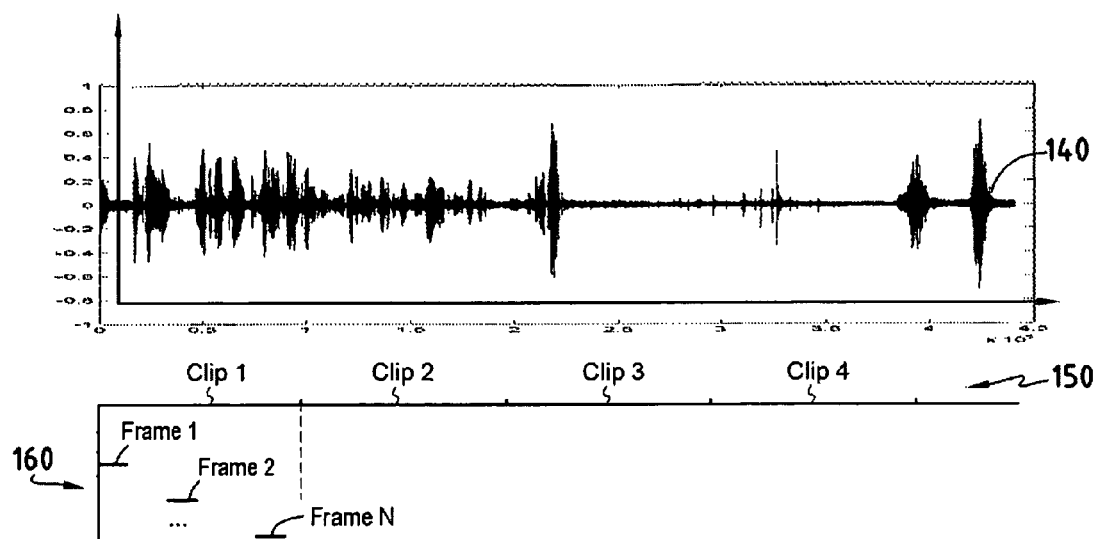
Figure 23A:
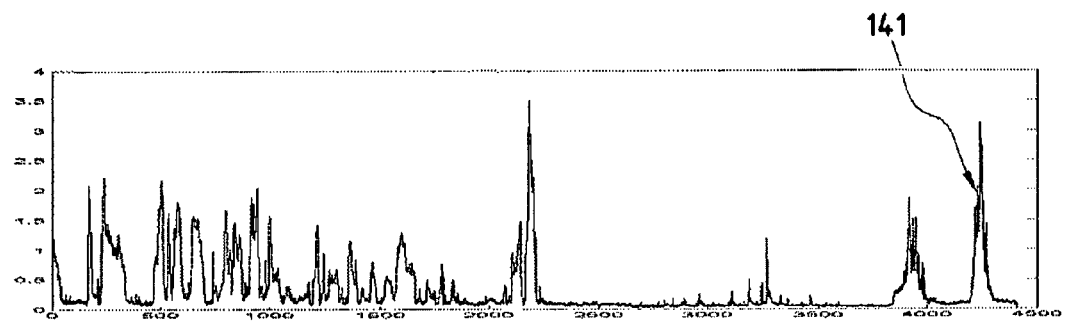
Figure 23B:
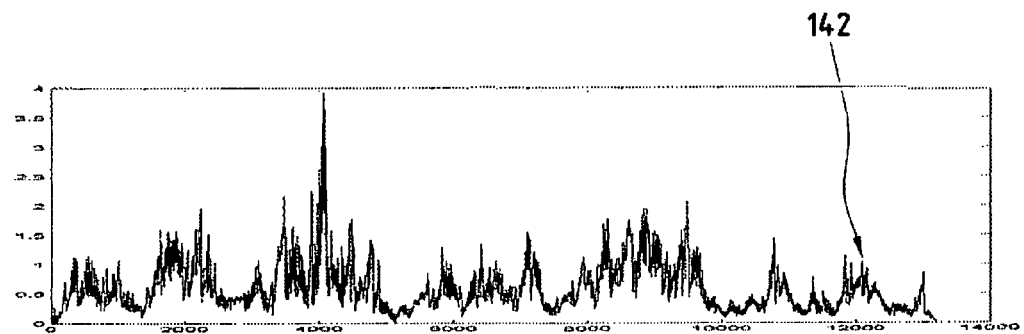
Figure 24A:
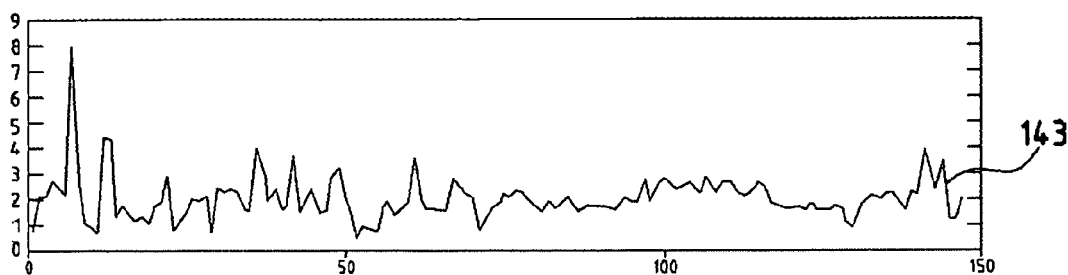
Figure 24B:
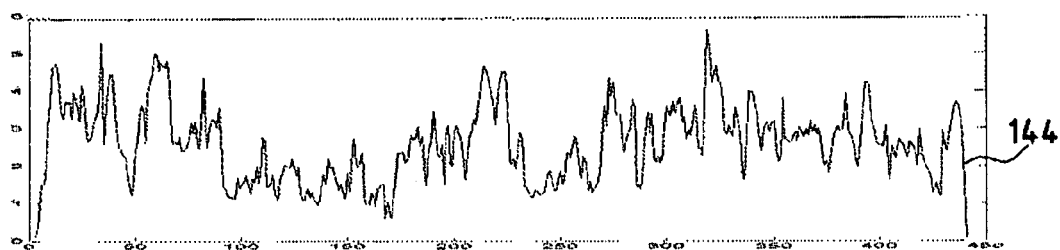
Figure 25A:
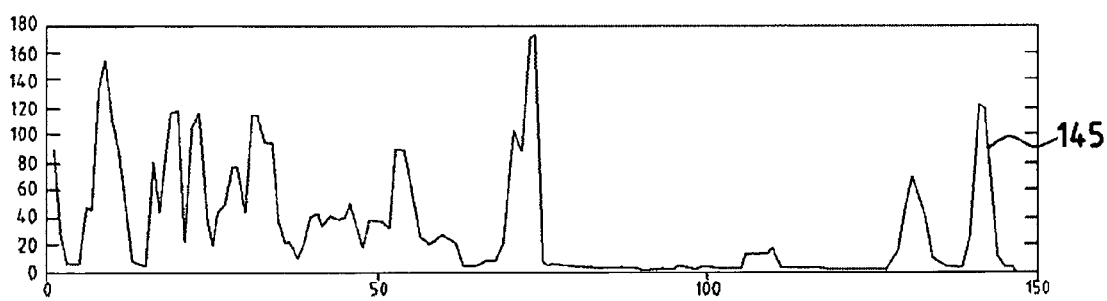
Figure 25B:
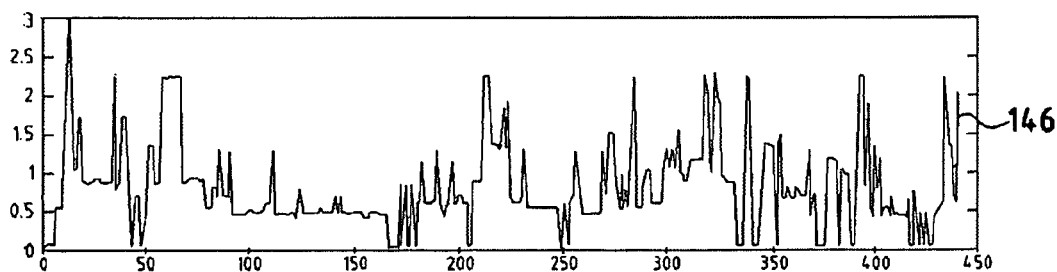
Figure 26A:
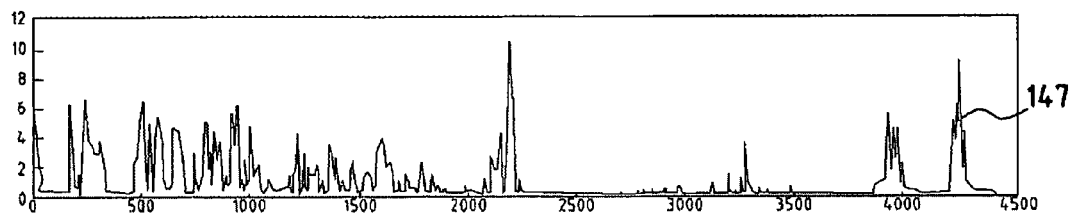
Figure 26B:
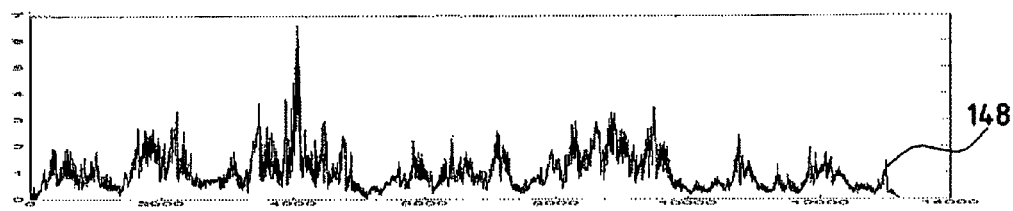
Figure 29:
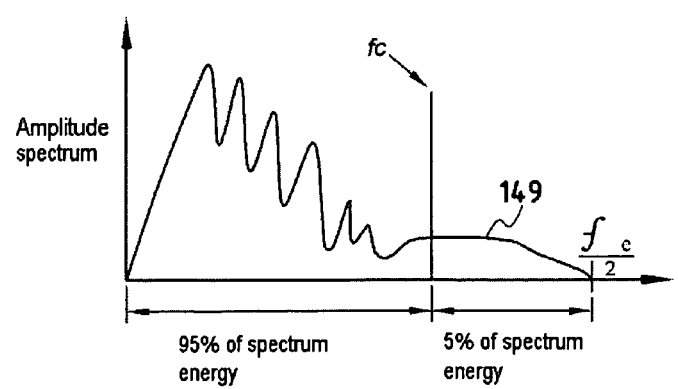
Figure 27A:
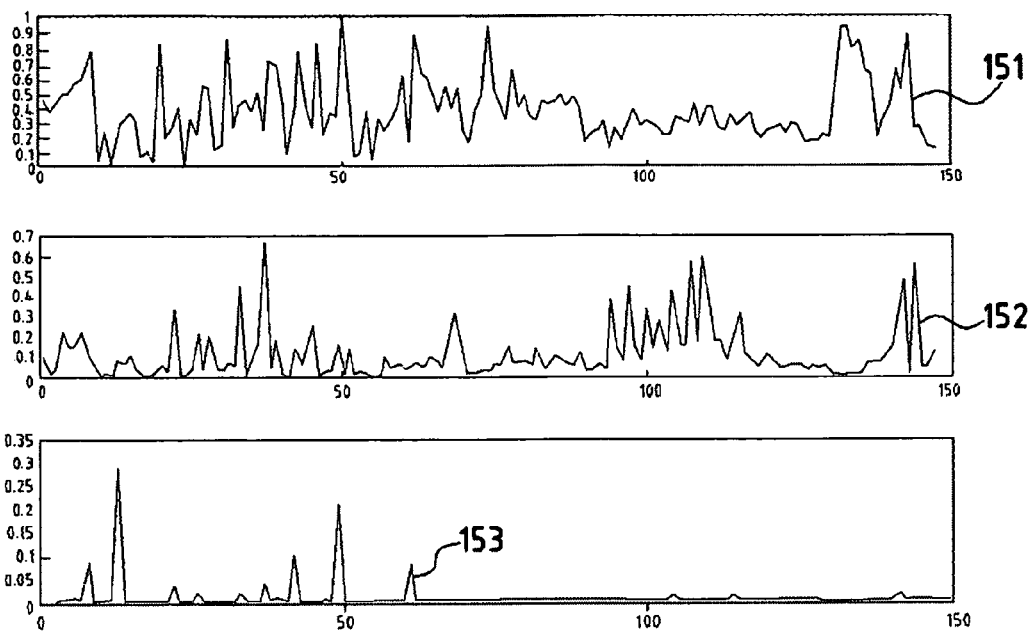
Figure 27B:
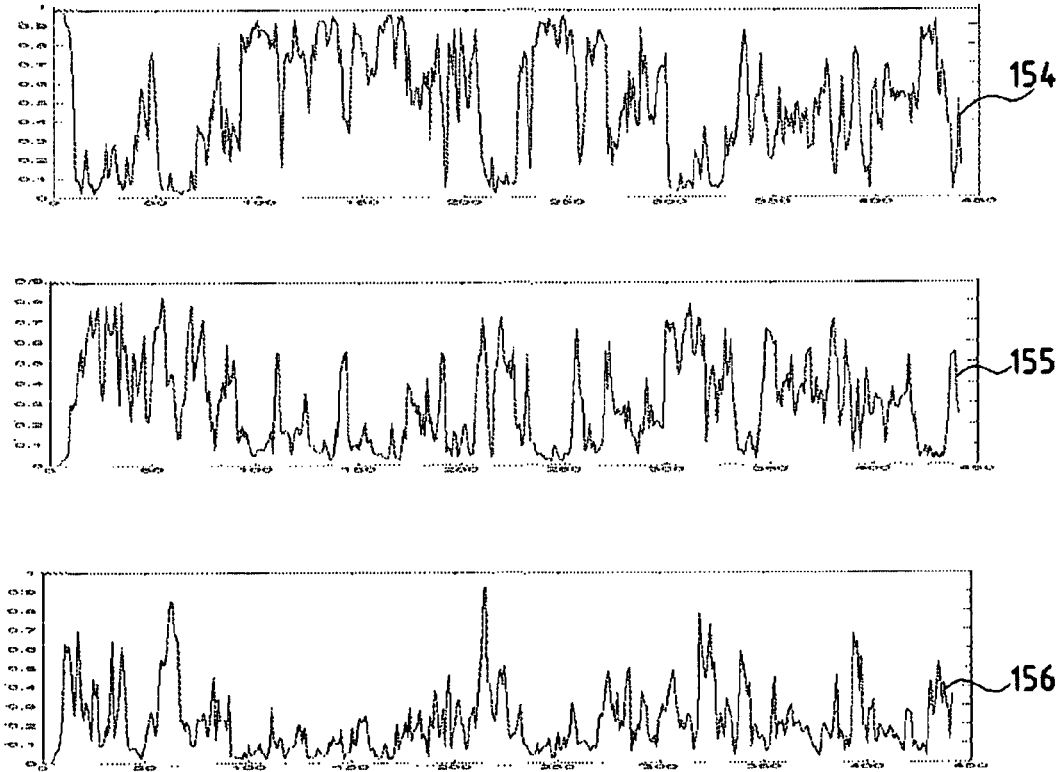
Figure 28A:
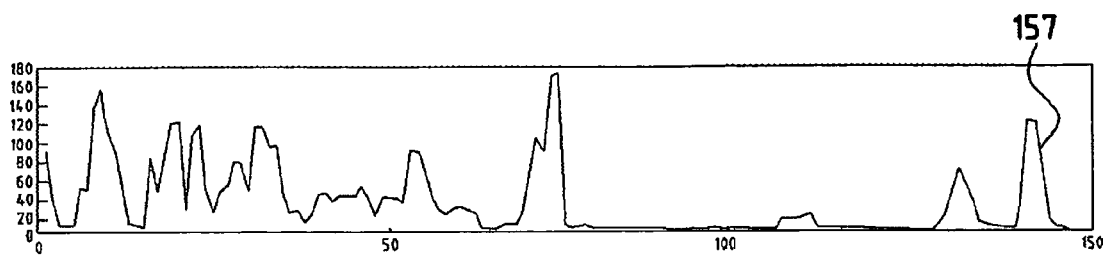
Figure 28B:
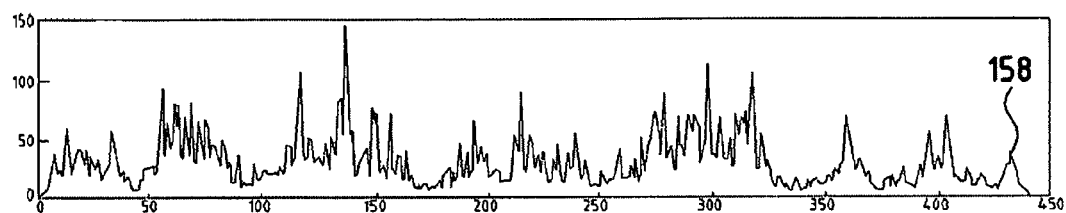
Figure 30:
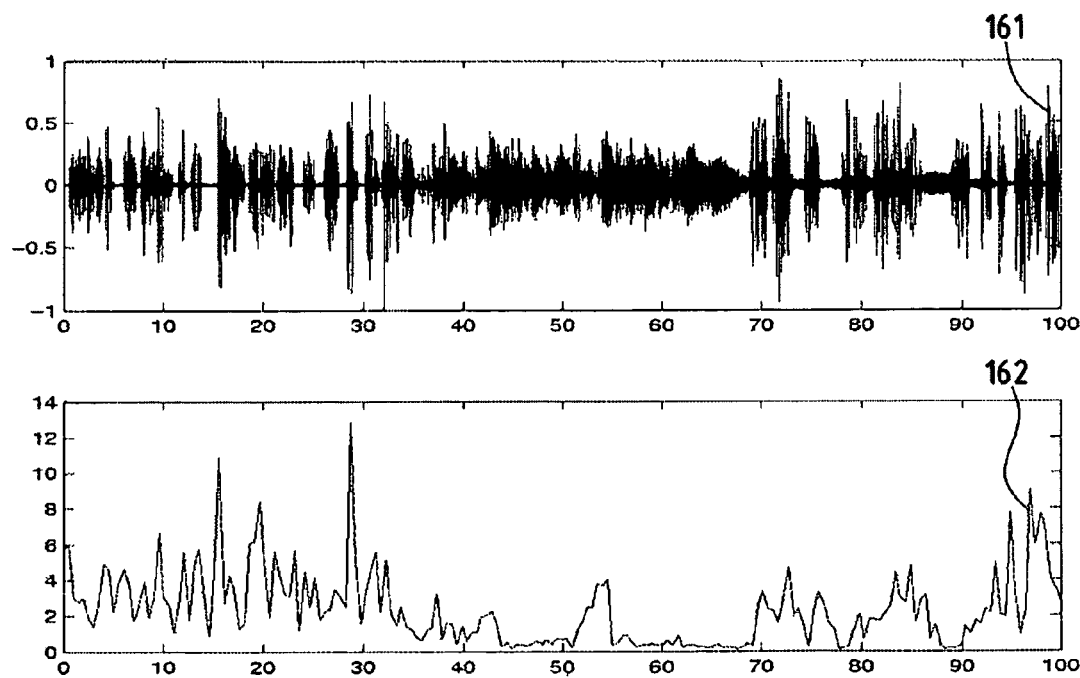

FIG. 15a1 is a 3D view of the spectrum of the image of FIG. 15a;

FIG. 15b is a second example of an image containing one directional element;

FIG. 15b1 is an image of the Fourier modulus for the image of FIG. 15b;

FIG. 15c shows a third example of an image containing two directional elements;

FIG. 15c1 is an image of the Fourier modulus of the image of FIG. 15c;

FIG. 16 shows the projection directions for pairs of integers ($\alpha$, $\beta$) in the context of calculating the discrete Fourier transform of an image;

FIG. 17 shows an example of the projection mechanism with the example of a pair of entries ($\alpha_k$, $\beta_k$)=(2, −1);

FIG. 18a1 shows an example of an image containing periodic components;

FIG. 18a2 shows the image of the modulus of the discrete Fourier transform of the image of FIG. 18a1;

FIG. 18b1 shows an example of a synthetic image containing one periodic component;

FIG. 18b2 is a 3D view of the discrete Fourier transform of the image of FIG. 18b1, showing a symmetrical pair of peaks;

FIG. 19 is a flow chart showing the various steps in processing an image with a vector being established that characterizes the spatial distribution of iconic properties of the image;

FIG. 20 shows an example of an image being partitioned and of a characteristic of said image being created;

FIG. 21 shows a rotation through 90° of the partitioned image of FIG. 20 and the creation of a vector characterizing this image;

FIG. 22 shows a sound signal made up of frames being decomposed into clips;

FIG. 23a shows the variation in the energy of a speech signal;

FIG. 23b shows the variation in the energy of a music signal;

FIG. 24a shows the zero crossing rate for a speech signal;

FIG. 24b shows the zero crossing rate for a music signal;

FIG. 25a shows the center of gravity of the frequency spectrum of the short Fourier transform of a speech signal;

FIG. 25b shows the center of gravity of the frequency spectrum of the short. Fourier transform of a music signal;

FIG. 26a shows the bandwidth of a speech signal;

FIG. 26b shows the bandwidth of a music signal;

FIG. 27a shows, for three frequency sub-bands 1, 2, and 3 the energy ratio for each frequency sub-band over the total energy over the entire frequency band, for a speech signal;

FIG. 27b shows, for three frequency sub-bands 1, 2, and 3, the energy ratio for each frequency sub-band over the total energy over the entire frequency band, for a music signal;

FIG. 28a shows the spectral flux of a speech signal;

FIG. 28b shows the spectral flux of a music signal;

FIG. 29 is a graph showing the definition of the cutoff frequency of a clip; and FIG. 30 shows energy modulation around 4 Hz for an audio signal.

With reference to FIGS. 1 to 5, the description begins with the general principle of the method of indexing multimedia documents in accordance with the invention that leads to a fingerprint base being built up, each indexed document being associated with a fingerprint that is specific thereto.

Starting from a multimedia document base 1, a first step 2 consists in identifying and extracting terms $t_i$ for each document, where the terms are constituted by vectors characterizing properties of the document to be indexed.

By way of example, a description is given below with reference to FIGS. 22 to 30 of the manner in which it is possible to identify and extract terms $t_i$ for a sound document.

An audio document 140 is initially decomposed into frames 160 that are subsequently grouped together into clips 150, each of which is characterized by a term constituted by a vector of parameters (FIG. 22). An audio document 140 is thus characterized by a set of terms $t_i$ that are stored in a term base 3 (FIG. 1).

Audio documents from which a characteristic vector is extracted can be sampled, for example, at 22,050 Hz in order to avoid any aliasing effect. The document is then subdivided into a set of frames, with the number of samples per frame being determined as a function of the type of file for analysis.

For an audio document rich in frequencies and containing many variations, e.g. as in films, variety shows, or even sporting events, the number of samples in a frame should be small, e.g. about 512 samples. In contrast, for an audio document that is homogeneous, e.g. containing only speech or only music, this number should be large, e.g. about 2,048 samples.

An audio document clip can be characterized by various parameters serving to make up the terms and characterizing time or frequency information.

It is possible to use all or some of the parameters that are mentioned below in order to form vectors of parameters constituting the terms identifying successive clips of the sampled audio document.

The energy of the frames of the audio signal constitutes a first parameter representing time information.

The energy of the audio signal varies a great deal in speech whereas it is rather stable in music. This thus serves to discriminate between speech and music, and also to detect silences. Energy can be coupled with another time parameter such as the rate of oscillation (RO) about a value, which may correspond for example to the zero crossing rate (ZCR). A low RO and high energy are synonymous with voiced sound, whereas a high RO represents a non-voiced zone.

FIG. 23a shows a signal 141 showing variation of energy for a speech signal.

FIG. 23b shows a signal 142 that illustrates variation in energy for a music signal.

Let N be the number of samples in a frame, then volume or energy E(n) is defined by:

$$E(n) = \frac{1}{N}\sum_{i=0}^{N-1} S_n^2(i) \qquad (2)$$

where $S_n(i)$ represents the value of sample i in the frame of index n of an audio signal.

Other parameters representative of time information can be deduced from energy, such as, for example;

the standard deviation of frame energies in the clips (also referred to as VSTD) which constitutes a state defined as the variance of frame volumes in a clip normalized relative to the maximum frame volume of the clip;

the sound variation ratio (SVR) which is constituted by the difference between the maximum and the minimum frame volumes of a clip divided by the maximum volume of said frames; and the low energy ratio (LER) which is the percentage of frames of volume lower than a threshold (e.g. set at 95% of the mean volume of a clip).

Other parameters enable the time aspect of a clip to be characterized, in particular the rate of oscillation about a predetermined value which, when said predetermined value is zero, defines the zero crossing rate (ZCR).

The ZCR may also be defined as the number of times the wave crosses zero.

$$Z(n) = \frac{1}{2}\left(\sum_{i=0}^{N-1} |\text{Sign}(S_n(i))| - (\text{Sign}(S_n(i-1))|)\right)\frac{f_s}{N} \qquad (3)$$

$S_n(i)$: value of sample i in frame n.

N: number of samples in a frame.

$f_s$: sampling frequency.

This characteristic is frequently used for distinguishing between speech and music. Sudden variations in ZCR are representative of alternations between voiced and non-voiced sound, and thus of the presence of speech. For speech, ZCR is low in voiced zones and very high for non-voiced zones, whereas for music, variations in ZCR are very small.

FIG. 24a shows a curve 143 representing an example of ZCR for a speech signal.

FIG. 24b shows a curve 144 representing an example of ZCR for a music signal.

Another parameter characterizing the time aspect of a clip may be constituted by a high rate of oscillation about a predetermined value which, when said predetermined value is zero, defines a high zero crossing rate (HZCR).

HZCR may be defined as being the ratio of the number of frames for which the ZCR has a value α, e.g. 1.5 greater than the mean ZCR of the clip (1s):

$$HZCR = \frac{1}{2N}\sum_{n=0}^{N-1}[\text{sgn}(ZCR(n) - 1.5 avZCR) + 1] \qquad (4)$$

such that:

$$avZCR = \frac{1}{N}\sum_{n=0}^{N-1} ZCR(n) \qquad (5)$$

with:

n: frame index;

N: number of frames in a clip.

For speech segments, clips are of 0 to 200 seconds (s) with an HZCR of around 0.15.

In contrast, for music segments, clips are of 200 s to 350 s and the HZCR lies around 0.05 and is generally almost zero.

For environmental sound, the segments corresponding to the clips are 351 s to 450 s.

HZCR is low for white noise and large for a deafening sound (e.g. a drum).

It is also possible to define a parameter ZCRD which is constituted by the difference between the ZCR number above and below the mean ZCR for the frames of a clip, and the parameter ZCRV which is constituted by the variance of the ZCR.

Another parameter characterizing the time aspect of a clip is the silent frame ratio (SFR) which is the percentage of non-silent frames in a clip.

A frame is said to be non-silent if its volume exceeds a certain threshold (10) and if the value of its ZCR is below a threshold ZCR.

Thus, the ratio of non-silent frames in a clip serves to detect silence.

Other statistical properties of ZCR can be used as characteristic parameters such as:

i) the third order moment of the mean; and ii) the number of ZCRs exceeding a certain threshold.

The parameters taken into account for defining the terms $t_i$ may also comprise frequency information taking account of a fast Fourier transform (FFT) calculated for the audio signal.

Thus, a parameter known as the spectral centroid (SC) may be defined as being the center of gravity of the frequency spectrum of the short Fourier transform (SFT) of the audio signal:

$$SC(n) = \frac{\sum_{i=0}^{N-1} i S_n(i)}{\sum_{i=0}^{N-1} S_n(i)} \quad (6)$$

such that $S_n(i)$: spectral power of frame No. i of clip No. n.

The parameter SC is high for music, since the high frequencies are spread over a wider zone than for speech (in general 6 octaves for music and only 3 for speech). This is associated with the sensation of brightness for the sound heard. This is an important perceptible attribute for characterizing tone color or "timbre".

FIG. 25a shows a curve 145 representing an example of SC for a speech signal.

FIG. 25b shows a curve 146 representing an example of SC for a music signal.

Another parameter is constituted by the bandwidth BW which can be calculated from the variance in the preceding parameter SC(n).

$$BW^2(n) = \frac{\sum_{i=0}^{N-1} (i - SC(n))^2 S_n(i)}{\sum_{i=0}^{N-1} S_n(i)} \quad (7)$$

The bandwidth BW is important both in music and in speech.

FIG. 26a shows a curve 147 presenting an example of the bandwidth of a speech signal.

FIG. 26b shows a curve 148 presenting an example of the bandwidth of a music signal.

Another useful parameter is constituted by the ratio SBER between the energy in a sub-band of frequency i and the total energy in the entire frequency band of the sampled audio signal.

With consideration to the perceptual properties of the human ear, the frequency band is decomposed into four sub-bands that correspond to the filters of the cochlea. When the sampling frequency is 22,025 Hz, the frequency bands are: 0-630 Hz, 630 Hz-1,720 Hz, 1,720 Hz-4,400 Hz, and 4,400 Hz-11,025 Hz. For each of these bands, its SBERi energy is calculated corresponding to the ratio of the energy in the band over the energy over the entire frequency band.

FIG. 27a shows three curves 151, 152, and 153 representing for three frequency sub-bands 1, 2, and 3, the energy ratio in each frequency sub-band over the total energy of the entire frequency band, for an example of a speech signal.

FIG. 27b shows three curves 154, 155, and 156 showing for three frequency sub-bands 1, 2, and 3, the energy ratio in each frequency sub-band over the total energy in the entire frequency band, for an example of a music signal.

Another parameter is constituted by the spectral flux SF which is defined as the mean value of spectral variation between two adjacent frames in a clip:

$$SF(n) = \frac{1}{N} \sum_{i=1}^{N} [\log(S_n(i) + \delta) - \log(S_n(i-1) + \delta)]^2 \quad (8)$$

where:

$\delta$: a constant of small value;

$S_n(i)$: spectral power of frame No. i of clip No. n.

The spectral flux of speech is generally greater than that of music, and the spectral flux of environmental sound is greater still. It varies considerably compared with the other two signals.

FIG. 28a shows a curve 157 representing the spectral flux of an example of a speech signal.

FIG. 28b shows a curve 158 representing the spectral flux of an example of a music signal.

Another useful parameter is constituted by the cutoff frequency of a clip (CCF).

FIG. 29 shows a curve 149 illustrating the amplitude spectrum as a function of frequency fe, and the cutoff frequency fc is the frequency beneath which 95% of the spectral energy (spectral power) is concentrated.

In order to determine the cutoff frequency of a clip, the clip Fourier transform DS(n) is calculated.

$$DS(n) = \sum_{i=0}^{N-1} S_n^2(i) \quad (9)$$

The cutoff frequency fc is determined by:

$$\sum_{i=0}^{fC} S_n^2(i) \geq 0.95 \times DS \quad (10)$$

and $$\sum_{i=0}^{fC-1} S_n^2(i) < 0.95 \times DS \quad (11)$$

The CCF is higher for a non-voiced sound (richer in high frequencies) than for a voiced sound (presence of speech in which power is concentrated in the low frequencies).

This measurement makes it possible to characterize changes between voiced and non-voiced periods in speech since this value is low for clips containing music only.

Other parameters can also be taken into account for defining the terms $t_i$ of an audio document, such as energy modulation around 4 Hz which constitutes a parameter coming simultaneously from frequency analysis and from time analysis.

The 4 Hz energy modulation (4EM) is calculated from the volume contour using the following formula:

$$4EM = \frac{\sum_{i=0}^{N/T}\left(\sum_{j=0}^{T} W(j) S_n^2(j + i \times T)\right)/T}{\sum_{i=0}^{N} S_n^2(i)} \quad (12)$$

where:

$S_n(i)$: spectral power of frame No. i of clip No. n;
$W(j)$: triangular window centered on 4 Hz;
T: width of a clip.

Speech has a 4EM that is greater than music since, for speech, syllable changes take place at around 4 Hz.

A syllable is a combination of a zone of low energy (consonant) and a zone of high energy (vowel).

FIG. 30 shows a curve 161 representing an example of an audio signal and a curve 162 showing for said signal the energy modulation around 4 Hz.

Multimedia documents including audio components are described above.

When indexing multimedia documents having video signals, it is possible to select terms $t_i$ that are constituted by key-images representing groups of consecutive homogeneous images.

The terms $t_i$ can in turn represent for example: dominant colors, textural properties, or the structures of dominant zones in the key-images of the video document.

In general, with images as described in greater detail below, the terms can represent dominant colors, textural properties, or the structures of dominant zones in an image. Several methods can be implemented in alternation or cumulatively, either over an entire image or over portions of the image, in order to determine the terms $t_i$ before characterizing the image.

For a document containing text, the terms $t_i$ may be constituted by words of the spoken or written language, by numbers, or by other identifiers constituted by combinations of characters (e.g. combinations of letters and digits).

Consideration is given again to indexing a multimedia document comprising video signals, in which terms $t_i$ are selected that are constituted by key-images representing groups of consecutive homogeneous images, and concepts $c_i$ are determined by grouping together terms $t_i$.

Detecting key-images relies on the way images in a video document are grouped together in groups each of which contains only homogeneous images. From each of these groups one or more images (referred to as key-images) are extracted that are representative of the video document.

The grouping together of video document images relies on producing a score vector SV representing the content of the video, characterizing variation in consecutive images of the video (the elements $SV_i$ represent the difference between the content of the image of index i and the image of index i−1), with SV being equal to zero when the contents $im_i$ and $im_{i-1}$ are identical, and it is large when the difference between the two contents is large.

In order to calculate the signal SV, the red, green, and blue (RGB) bands of each image $im_i$ of index i in the video are added together to constitute a single image referred to as TRi. Thereafter the image TRi is decomposed into a plurality of frequency bands so as to retain only the low frequency component LTRi. To do this, two mirror filters (a low pass filter LP and a high pass filter HP) are used which are applied in succession to the rows and to the columns of the image. Two types of filter are considered: a Haar wavelet filter and the filter having the following algorithm:

Row Scanning
  From TRk the low image is produced
  For each point $a_{2 \times i, j}$ of the image TR, do
  Calculate the point $b_{i, j}$ of the low frequency low image, $b_{i, j}$ takes the mean value of $a_{2 \times i, j-1}$, $a_{2 \times i, j}$, and $a_{2 \times i, j+1}$.

Column Scan
  From two low images, the image LTRk is produced
  For each point $b_{i, 2 \times j}$ of the image TR, do
  Calculate the point $bb_{i, j}$ of the low frequency low image, $bb_{i, j}$ takes the mean value of $b_{i, 2 \times j-1}$, $b_{i, 2 \times j}$, and $b_{i, 2 \times j+1}$.

The row and column scans are applied as often as desired. The number of iterations depends on the resolution of the video images. For images having a size of 512×512, n can be set at three.

The result image LTRi is projected in a plurality of directions to obtain a set of vectors Vk, where k is the projection angle (element j of V0, the vector obtained following horizontal projection of the image, is equal to the sum of all of the points of row j in the image). The direction vectors of the image LTRi are compared with the direction vectors of the image LTRi−1 to obtain a score i which measures the similarity between the two images. This score is obtained by averaging all of the vector distances having the same direction: for each k, the distance is calculated between the vector Vk of image i and the vector Vk of image i−1, and then all of these distances are calculated.

The set of all the scores constitutes the score vector SV: element i of SV measures the similarity between the image LTRi and the image LTRi−1. The vector SV is smoothed in order to eliminate irregularities due to the noise generated by manipulating the video.

There follows a description of an example of grouping images together and extracting key-images.

The vector SV is analyzed in order to determine the key-images that correspond to the maxima of the values of SV. An image of index j is considered as being a key-image if the value SV(j) is a maximum and if SV(j) is situated between two minimums minL (left minimum) and minR (right minimum) and if the minimum M1 where:

$$M1 = \min(|SV(Cj) - \min G|, |SV(j) - \min R|)$$

is greater than a given threshold.

In order to detect key-images, minL is initialized with SV(0) and then the vector SV is scrolled through from left to right. At each step, the index j corresponding to the maximum value situated between two minimums (minL and minR) is determined, and then as a function of the result of the equation defining M1 it is decided whether or not to consider j as being an index for a key-image. It is possible to take a group of several adjacent key-images, e.g. key-images having indices j−1, j, and j+1.

Three situations arise if the minimum of the two slopes, defined by the two minimums (minL and minR) and the maximum value, is not greater than the threshold:

i) if |SV(j)=minL| is less than the threshold and minL does not correspond to SV(0), then the maximum SV(j) is ignored and minR becomes minL;

ii) if |SV(j)−minL| is greater than the threshold and if |SV(j)−minR| is less than the threshold, then minR and the maximum SV(j) are retained and minL is ignored unless the closest maximum to the right of minR is greater than a threshold. Under such circumstances, minR is also retained and j is declared as being an index of a key-image. When minR is ignored, minR takes the value closest to the minimum situated to the right of minR; and iii) if both slopes are less than the threshold, minL is retained and minR and j are ignored.

After selecting a key-image, the process is iterated. At each iteration, minR becomes minL.

With reference again to FIG. 1; starting from a term base 3 having P terms, the terms $t_i$ are processed in a step 4 and grouped together into concepts $c_i$ (FIG. 2) for storing in a concept dictionary 5. The idea at this point is to generate a step of signatures characterizing a class of documents. The signatures are descriptors which, e.g. for an image, represent color, shape, and texture. A document can then be characterized and represented by the concepts of the dictionary.

A fingerprint of a document can then be formed by the signature vectors of each concept of the dictionary 5. The signature vector is constituted by the documents where the concept $c_i$ is present and by the positions and the weight of said concept in the document.

The terms $t_i$ extracted from a document base 1 are stored in a term base 3 and processed in a module 4 for extracting concepts $c_i$ which are themselves grouped together in a concept dictionary 5. FIG. 2 shows the process of constructing a concept base $c_i$ ($1 \leq i \leq m$) from terms $t_j$ ($1 \leq j \leq n$) presenting similarly scores $w_{ij}$.

The module for producing the concept dictionary receives as input the set P of terms from the base 3 and the maximum desired number N concepts is set by the user. Each concept $c_i$ is intended to group together terms that are neighbors from the point of view of their characteristics.

In order to produce the concept dictionary, the first step is to calculate the distance matrix T between the terms of the base 3, with this matrix being used to create a partition of cardinal number equal to the desired number N of concepts.

The concept dictionary is set up in two stages:
decomposing P into N portions $P = P_1 \cup P_2 \ldots \cup P_N$;
optimizing the partition that decomposes P into M classes $P = C_1 \cup C_2 \ldots \cup C_M$ with M less than or equal to P.

The purpose of the optimization process is to reduce the error in the decomposition of P into N portions $\{P_1, P_2, \ldots, P_N\}$ where each portion $P_i$ is represented by the term $t_i$ which is taken as being a concept, with the error that is then committed being equal to the following expression:

$$\varepsilon = \sum_{i=1}^{N} \varepsilon_{t_i}, \quad \varepsilon_{t_i} = \sum_{t_j \in P_i} d^2(t_i, t_j)$$

is the error committed when replacing the terms $t_j$ of $P_i$ by $t_i$.

It is possible to decompose P into N portions in such a manner as to distribute the terms so that the terms that are furthest apart lie in distinct portions while terms that are closer together lie in the same portions.

Step 1 of decomposing the set of terms P into two portions $P_1$ and $P_2$ is described initially:

a) the two terms $t_i$ and $t_j$ in P that are farthest apart are determined, this corresponding to the greatest distance $D_{ij}$ of the matrix T;

b) for each $t_k$ of P, $t_k$ is allocated to $P_1$ if the distance $D_{ki}$ is smaller than the distance $D_{kj}$, otherwise it is allocated to $P_2$.

Step 1 is iterated until the desired number of portions has been obtained, and on each iteration steps a) and b) are applied to the terms of set $P_1$ and set $P_2$.

The optimization stage is as follows.

The starting point of the optimization process is the N disjoint portions of P $\{P_1, P_2, \ldots, P_N\}$ and the N terms $\{t_1, t_2, \ldots, t_N\}$ representing them, and it is used for the purpose of reducing the error in decomposing P into $\{P_1, P_2, \ldots, P_N\}$ portions.

The process begins by calculating the centers of gravity $c_i$ of the $P_i$. Thereafter the error $$\varepsilon c_i = \sum_{t_j \in P_i} d^2(t_i, t_j)$$

is calculated that is compared with $\varepsilon c_i$, and $t_i$ is replaced by $c_i$ if $\varepsilon c_i$ is less than $\varepsilon t_i$. Then after calculating the new matrix T and if convergence is not reached, decomposition is performed. The stop condition is defined by:

$$\frac{(\varepsilon c_t - \varepsilon c_{t+1})}{\varepsilon c_t} < \text{threshold}$$

which is about $10^{-3}$, $ec_t$ being the error committed at the instant t that represents the iteration.

There follows a matrix T of distances between the terms, where $D_{ij}$ designates the distance between term $t_i$ and term $t_j$.

|       | $t_0$    | $t_i$    | $t_k$    | $t_j$    | $t_n$    |
|-------|----------|----------|----------|----------|----------|
| $t_0$ | $D_{00}$ | $D_{0i}$ | $D_{0k}$ | $D_{0j}$ | $D_{0n}$ |
| $t_i$ | $D_{i0}$ | $D_{ii}$ | $D_{ik}$ | $D_{ij}$ | $D_{in}$ |
| $t_k$ | $D_{k0}$ | $D_{ki}$ | $D_{kk}$ | $D_{kj}$ | $D_{kn}$ |
| $t_j$ | $D_{j0}$ | $D_{ji}$ | $D_{jk}$ | $D_{jj}$ | $D_{jn}$ |
| $t_n$ | $D_{n0}$ | $D_{ni}$ | $D_{nk}$ | $D_{nj}$ | $D_{nn}$ |

Figure 3:
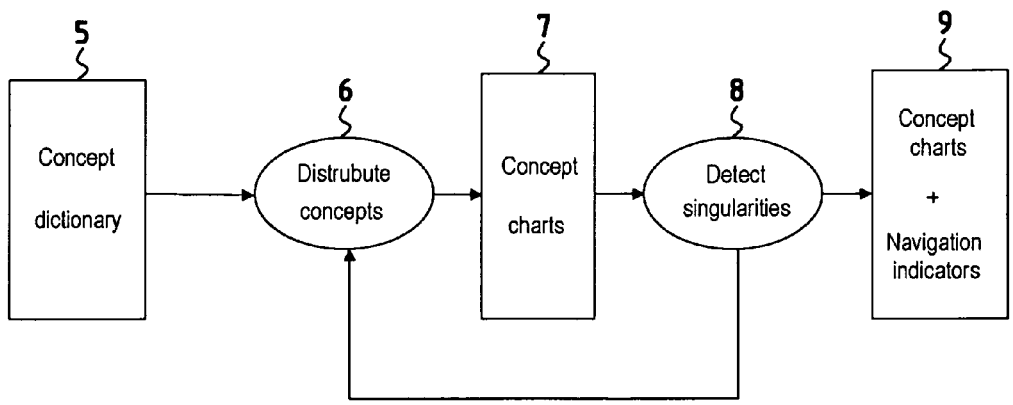
FIG. 3 is a block diagram showing the process of structuring a concept dictionary in accordance with the invention.

For multimedia documents having a variety of contents, FIG. 3 shows an example of how the concept dictionary 5 is structured.

In order to facilitate navigation inside the dictionary 5 and determine quickly during an identification stage the concept that is closest to a given term, the dictionary 5 is analyzed and a navigation chart 9 inside the dictionary is established.

The navigation chart 9 is produced iteratively. On each iteration, the set of concepts is initially split into two subsets, and then on each iteration, one of the subsets is selected until the desired number of groups is obtained or until the stop criterion is satisfied. The stop criterion may be, for example, that the resulting subsets are all homogeneous with a small standard deviation, for example. The final result is a binary tree in which the leaves contain the concepts of the dictionary and the nodes of the tree contain the information necessary for traversing the tree during the stage of identifying a document.

There follows a description of an example of the module 6 for distributing a set of concepts.

The set of concepts C is represented in the form of a matrix $$M = [c_1, c_2, \ldots, c_N] \in R^{p*N},$$

where $c_i \in \Re^p$, where $c_i$ represents a concept having p values. Various methods can be used for obtaining an axial distribution. The first step is to calculate the center of gravity C and the axis used for decomposing the set into two subsets.

The processing steps are as follows:

Step 1: calculating a representative of the matrix M such as the centroid w of matrix M:

$$w = \frac{1}{N} \sum_{i=1}^{N} c_i \qquad (13)$$

Step 2: calculating the covariance matrix $\tilde{M}$ between the elements of the matrix M and the representative of the matrix M, giving in the above special case $$\tilde{M} = M - we, \text{ where } e = [1,1,1,\ldots,1] \qquad (14)$$

Step 3: calculate an axis for projecting the elements of the matrix M, e.g. the eigenvector U associated with the greatest eigenvalue of the covariance matrix.

Step 4: calculate the value $pi = u^T(c_i - w)$ and decompose the set of concepts C into two substeps C1 and C2 as follows:

$$\begin{cases} c_i \in C1 \text{ if } pi \leq 0 \\ c_i \in C2 \text{ if } pi > 0 \end{cases} \qquad (15)$$

The data set stored in the node associated with C is {u, w, |p1|, p2} where p1 is the maximum of all pi≦0 and p2 is the minimum of all pi>0.

The data set {u, w, |p1|, p2} constitutes the navigation indicators in the concept dictionary. Thus, during the identification stage for example, in order to determine the concept that is closest to a term $t_i$, the value $pti = u^T(t_i - w)$ is calculated and then the node associated with C1 is selected if |(|pti|−|p1|)|<|(|pti|−p2)|, else the node C2 is selected. The process is iterated until one of the leaves of the tree has been reached.

A singularity detector module 8 may be associated with the concept distribution module 6.

The singularity detector serves to select the set Ci that is to be decomposed. One of the possible methods consists in selecting the less compact set.

Figure 4:
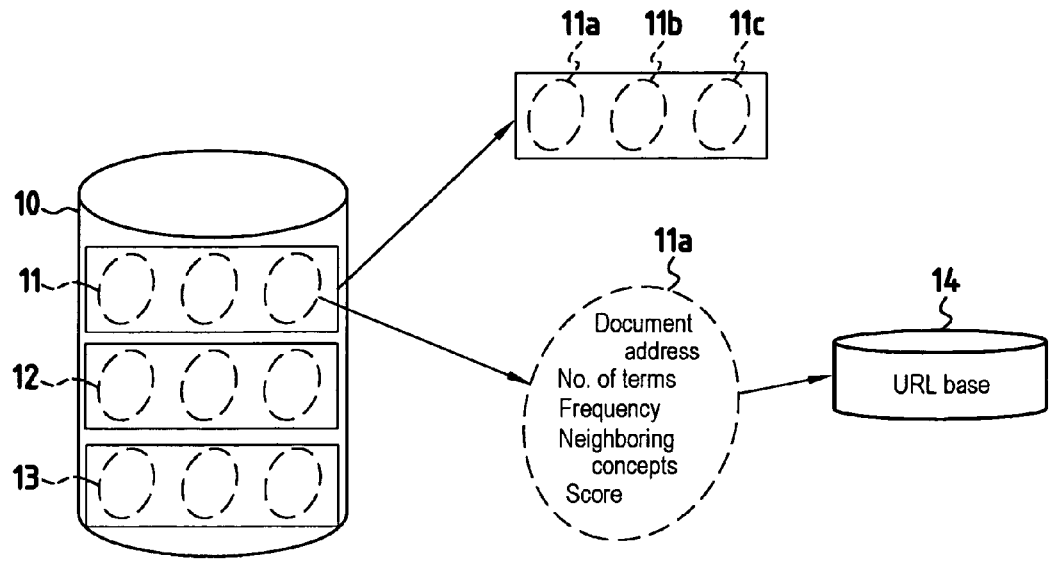
FIG. 4 shows the structuring of a fingerprint base implemented in the context of the method of the invention.
Figure 5:
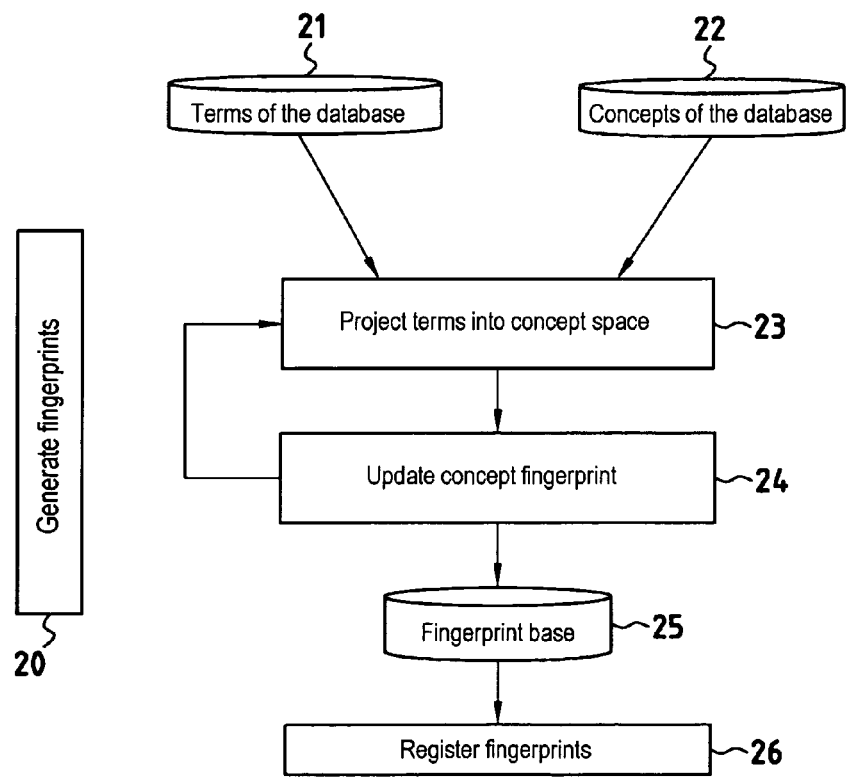
FIG. 5 is a flow chart showing the various steps of building a fingerprint base.

FIGS. 4 and 5 show the indexing of a document or a document base and the construction of a fingerprint base 10.

The fingerprint base 10 is constituted by the set of concepts representing the terms of the documents to be protected. Each concept Ci of the fingerprint base 10 is associated with a fingerprint 11, 12, 13 constituted by a data set such as the number of terms in the documents where the concept is present, and for each of these documents, a fingerprint 11a, 11b, 11c is registered comprising the index of the document pointing to the address of the document, the number of terms, the number of occurrences of the concept (frequency), the score, and the concepts that are adjacent thereto in the document. The score is a mean value of similarity measurements between the concept and the terms of the document which are closest to the concept. The index of a given document which points to the address of said document is stored in a database 14 containing the addresses of protected documents.

The process 20 for generating fingerprints or signatures of the documents to be indexed is shown in FIG. 5.

When a document is registered, the pertinent terms are extracted from the document (step 21), and the concept dictionary is taken into account (step 22). Each of the terms $t_i$ of the document is projected into the space of the concepts dictionary in order to determine the concept $c_i$ that represents the term $t_i$ (step 23).

Thereafter the fingerprint of concept $c_i$ is updated (step 24). This updating is performed depending on whether or not the concept has already been encountered, i.e. whether it is present in the documents that have already been registered.

If the concept $c_i$ is not yet present in the database, then a new entry is created in the database (an entry in the database corresponds to an object made up of elements which are themselves objects containing the signature of the concept in those documents where the concept is present). The newly created event is initialized with the signature of the concept. The signature of a concept in a document is made up mainly of the following data items: document address, number of terms, frequency, adjacent concepts, and score.

If the concept $c_i$ exists in the database, then the entry associated with the concept has added thereto its signature in the query document, which signature is made up of (document address, number of terms, frequency, adjacent concepts, and score).

Once the fingerprint base has been constructed (step 25), the fingerprint base is registered (step 26).

Figure 6:
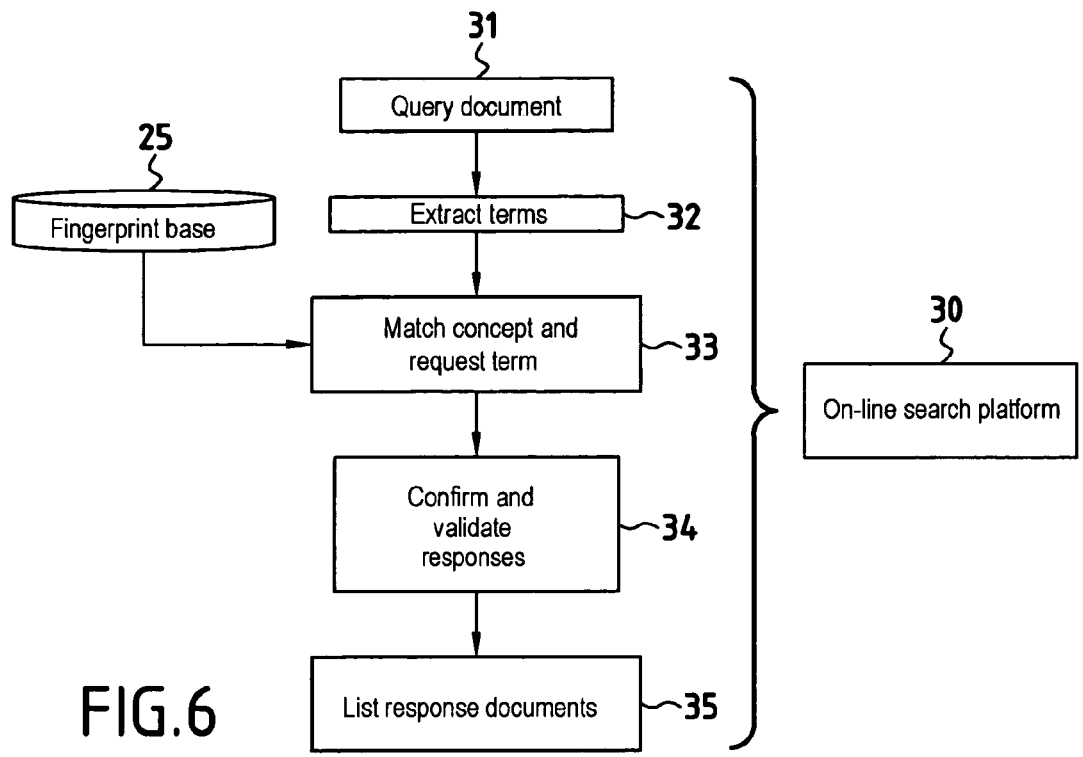
FIG. 6 is a flow chart showing the various steps of identifying documents.

FIG. 6 shows a process of identifying a document that is implemented on an on-line search platform 30.

The purpose of identifying a document is to determine whether a document presented as a query constitutes reutilization of a document in the database. It is based on measuring the similarity between documents. The purpose is to identify documents containing protected elements. Copying can be total or partial. When partial, the copied element will have been subjected to modifications such as: eliminating sentences from a text, eliminating a pattern from an image, eliminating a shot or a sequence from a video document, . . . , changing the order of terms, or substituting terms with other terms in a text.

After presenting a document to be identified (step 31), the terms are extracted from that document (step 32).

In association with the fingerprint base (step 25), the concepts calculated from the terms extracted from the query are put into correspondence with the concepts of the database (step 33) in order to draw up a list of documents having contents similar to the content of the query document.

The process of establishing the list is as follows:

$p_{dj}$ designates the degree of resemblance between document dj and the query document, with $1 \leq j \leq N$, where N is the number of documents in the reference database.

All $p_{dj}$ are initialized to zero.

Figure 7:
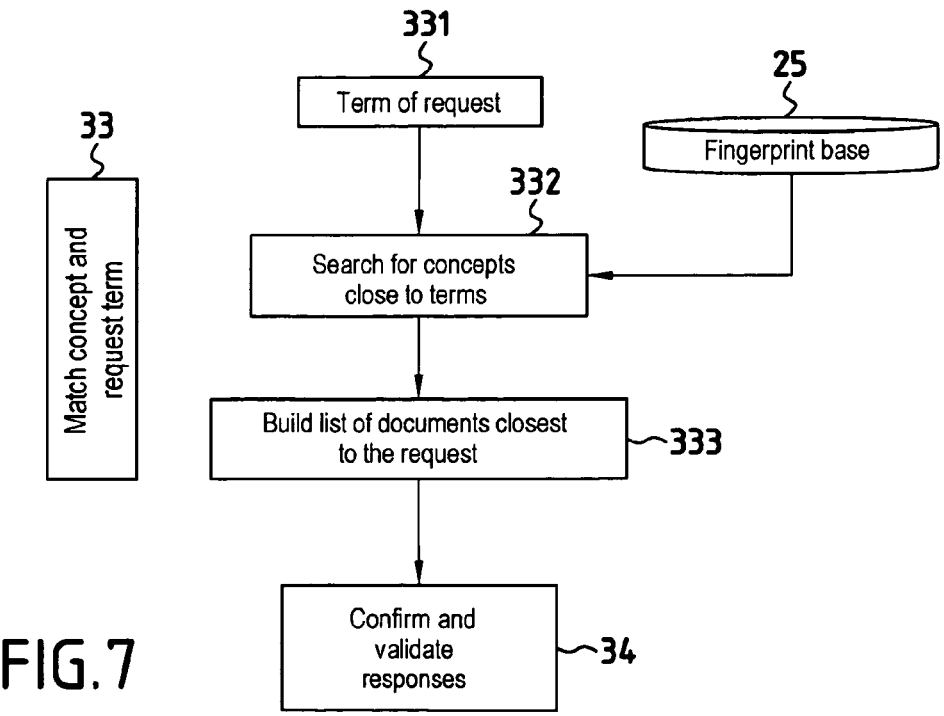
FIG. 7 is a flow chart showing how a first list of responses is selected.

For each term $t_i$ in the query provided in step 331 (FIG. 7), the concept Ci that represents it is determined (step 332).

For each document dj where the concept is present, its $p_{dj}$ is updated as follows:

$$p_{dj} = p_{dj} + f(\text{frequency, score})$$

where several functions f can be used, e.g.:

$$f(\text{frequency, score}) = \text{frequency} \times \text{score}$$

where frequency designates the number of occurrences of concept Ci in document dj and where score designates the mean of the resemblance scores of the terms of document dj with concept Cj.

The $p_{dj}$ are ordered, and those that are greater than a given threshold (step 333) are retained. Then the responses are confirmed and validated (step 34).

Response confirmation: the list of responses is filtered in order to retain only the responses that are the most pertinent. The filtering used is based on the correlation between the terms of the query and each of the responses.

Validation: this serves to retain only those responses where it is very certain that content has been reproduced. During this step, responses are filtered, taking account of algebraic and topological properties of the concepts within a document: it is required that neighborhood in the query document is matched in the response documents, i.e. two concepts that are neighbors in the query document must also be neighbors in the response document.

The list of response documents is delivered (step 35).

Consideration is given below in greater detail to multimedia documents that contain images.

The description bears in particular on building up the fingerprint base that is to be used as a tool for identifying a document, based on using methods that are fast and effective for identifying images and that take account of all of the pertinent information contained in the images going from characterizing the structures of objects that make them up, to characterizing textured zones and background color. The objects of the image are identified by producing a table summarizing various statistics made on information about object boundary zones and information on the neighborhoods of said boundary zones. Textured zones can be characterized using a description of the texture that is very fine, both spatially and spectrally, based on three fundamental characteristics, namely its periodicity, its overall orientation, and the random appearance of its pattern. Texture is handled herein as a two-dimensional random process. Color characterization is an important feature of the method. It can be used as a first sort to find responses that are similar based on color, or as a final decision made to refine the search.

In the initial stage of building up fingerprints, account is taken of information classified in the form of components belonging to two major categories:

so-called "structural" components that describe how the eye perceives an object that may be isolated or a set of objects placed in an arrangement in three dimensions (images 81 and 82 of FIGS. 11 and 12); and so-called "textural" components that complement structural components and represent the regularity or uniformity of texture patterns (images 82 and 83 of FIGS. 12 and 13).

FIG. 11 thus shows an image 81 containing structural elements that do not present any texture patterns.

FIG. 12 shows an image 81 containing structural elements and a textured background.

FIG. 13 shows an image 83 having no structural elements but that is entirely textured.

As mentioned above, during the stage of building fingerprints, each document in the document base is analyzed so as to extract pertinent information therefrom. This information is then indexed and analyzed. The analysis is performed by a string of procedures that can be summarized as three steps:

for each document, extracting predefined characteristics and storing this information in a "term" vector;

grouping together in a concept all of the terms that are "neighboring" from the point of view of their characteristics, thus enabling searching to be made more concise; and building a fingerprint that characterizes the document using a small number of entities. Each document is thus associated with a fingerprint that is specific thereto.

Figure 8:
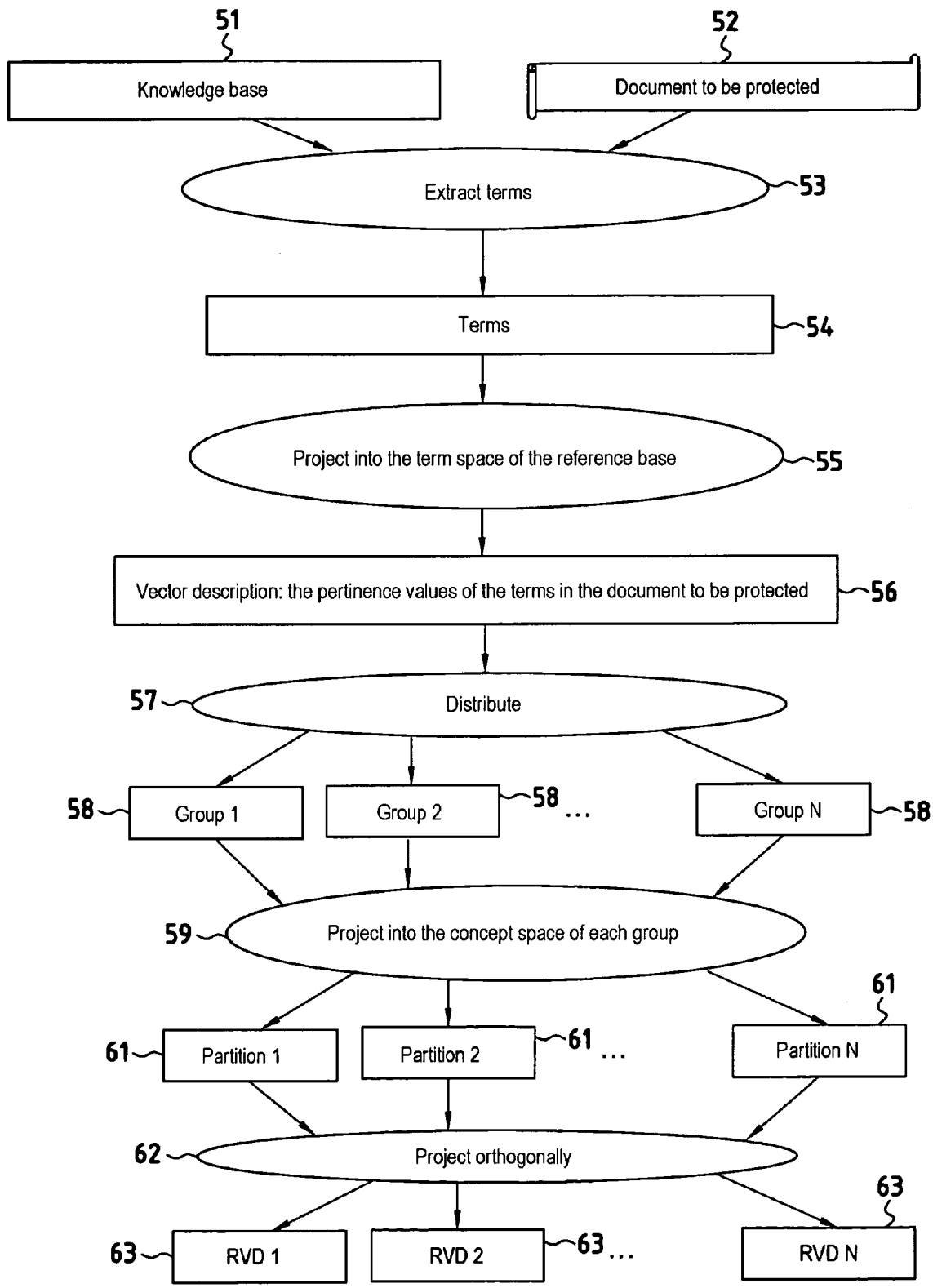
FIG. 8 is a flow chart showing the various steps in a stage of indexing documents in accordance with the method of the invention.

FIG. 8 shows the indexing of an image document 52 contained in a previously registered image base 51 in order to characterize the image 52 by a finite number of parameters that can subsequently be stored and manipulated easily. In step 53, terms are extracted from the document to be searched and they are stored in a buffer memory (step 54).

In step 55, projection is performed in the term space of the reference base.

In step 56, a vectorial description is obtained giving pertinence values to the terms in the document to be searched.

Step 57 consists in distributing the terms in N groups 58 of concepts.

Step 59 consists in projecting each group 58 into concept space in order to obtain N partitions 62.

Finally, an orthogonal projection 62 leads to N sets 63 of reduced vectorial descriptions (RVD).

In a subsequent search stage, following a request made by a user, e.g. to identify a query image, a search is made for all multimedia documents that are similar or that comply with the request. To do this, as mentioned above, the terms of the query document are calculated and they are compared with the concepts of the databases in order to deduce which document(s) of the database is/are similar to the query document.

The stage of constructing the terms of an image is described in greater detail below.

The stage of constructing the terms of an image usefully implements characterization of the structural supports of the image. Structural supports are elements making up a scene of the image. The most significant are those that define the objects of the scene since they characterize the various shapes that are perceived when any image is observed.

This step concerns extracting structural supports. It consists in dismantling boundary zones of image objects, where boundaries are characterized by locations in which high levels of intensity variation are observed between two zones. This dismantling operates by a method that consists in distributing the boundary zones amongst a plurality of "classes" depending on the local orientation of the image gradient (the orientation of the variation in local intensity). This produces a multitude of small elements referred to as structural support elements (SSE). Each SSE belongs to an outline of a scene and is characterized by similarity in terms of the local orientation of its gradient. This is a first step that seeks to index all of the structural support elements of the image.

The following process is then performed on the basis of these SSEs, i.e. terms are constructed that describe the local and global properties of the SSEs.

The information extracted from each support is considered as constituting a local property. Two types of support can be distinguished: straight rectilinear elements (SRE), and curved arcuate elements (CAE).

The straight rectilinear elements SRE are characterized by the following local properties:

dimension (length, width);

main direction (slope);

statistical properties of the pixels constituting the support (mean energy value, moments); and neighborhood information (local Fourier transform).

The curved arcuate elements CAE are characterized in the same manner as above, together with the curvature of the arcs.

Global properties cover statistics such as the numbers of supports of each type and their dispositions in space (geometrical associations between supports: connexities, left, right, middle, . . . ).

To sum up, for a given image, the pertinent information extracted from the objects making up the image is summarized in Table 1.

TABLE 1

| Structural supports of objects of an image | | Type | | |
|---|---|---|---|---|
| | | SSE | SRE | CAE |
| Global properties | Total number | n | $n_1$ | $n_2$ |
| | Number long (>threshold) | n1 | $n_1 l$ | $n_2 l$ |
| | Number short (<threshold) | nc | $n_1 c$ | $n_2 c$ |
| | Number of long supports at a left or right connection | — | $n_1 lgdx$ | $n_2 lgdx$ |
| | Number of middle connection | — | $n_1 lgdx$ | $n_2 lgdx$ |
| | Number of parallel long supports | — | $n_1 pll$ | $n_2 pll$ |
| Local properties | Luminance (>threshold) | — | | |
| | Luminance (<threshold) | — | | |
| | Slope | — | | |
| | Curvature | — | | |
| | Characterization of the neighborhood of the supports | — | | |

The stage of constructing the terms of an image also implements characterizing pertinent textual information of the image. The information coming from the texture of the image is subdivided by three visual appearances of the image:

random appearance (such as an image of fine sand or grass) where no particular arrangement can be determined;

periodic appearance (such as a patterned knit) or a repetition of dominant patterns (pixels or groups of pixels) is observed; and finally a directional appearance where the patterns tend overall to be oriented in one or more privileged directions.

This information is obtained by approximating the image using parametric representations or models. Each appearance is taken into account by means of the spatial and spectral representations making up the pertinent information for this portion of the image. Periodicity and orientation are characterized by spectral supports while the random appearance is represented by estimating parameters for a two-dimensional autoregressive model.

Once all of the pertinent information has been extracted, it is possible to proceed with structuring texture terms.

TABLE 2

Spectral supports and autoregressive parameters of the texture of an image

| Periodic component | Total number of periodic elements | np |
|---|---|---|
| | Frequencies | Pair $(\omega_p, v_p)$, $0 < p \leq np$ |
| | Amplitudes | Pair $(C_p, D_p)$, $0 < p \leq np$ |
| Directional component | Total number of directional elements | nd |
| | Orientations | Pair $(\alpha_i, \beta_i)$, $0 < p \leq np$ |
| | Frequencies | $v_i, 0 < i \leq nd$ |
| Random components | Noise standard deviation | $\sigma$ |
| | Autoregressive parameters | $\{a_{i,j}\}, (i,j) \in S_{N,M}$ |

Finally, the stage of constructing the terms of an image can also implement characterizing the color of the image.

Color is often represented by color histograms, which are invariant in rotation and robust against occlusion and changes in camera viewpoint.

Color quantification can be performed in the red, green, blue (RGB) space, the hue, saturation, value (HSV) space, or the LUV space, but the method of indexing by color histograms has shown its limitations since it gives global information about an image, so that during indexing it is possible to find images that have the same color histogram but that are completely different.

Numerous authors propose color histograms that integrate spatial information. For example this can consist in distinguishing between pixels that are coherent and pixels that are incoherent, where a pixel is coherent if it belongs to a relatively large region of identical pixels, and is incoherent if it forms part of a region of small size.

A method of characterizing the spatial distribution of the constituents of an image (e.g. its color) is described below that is less expensive in terms of computation time than the above-mentioned methods, and that is robust faced with rotations and/or shifts.

The various characteristics extracted from the structural support elements together with the parameters of the periodic, directional, and random components of the texture field, and also the parameters of the spatial distribution of the constituents of the image constitute the "terms" that can be used for describing the content of a document. These terms are grouped together to constitute "concepts" in order to reduce the amount of "useful information" of a document.

The occurrences of these concepts and their positions and frequencies constitute the "fingerprint" of a document. These fingerprints then act as links between a query document and documents in a database while searching for a document.

An image does not necessarily contain all of the characteristic elements described above. Consequently, identifying an image begins with detecting the presence of its constituent elements.

Figure 9:
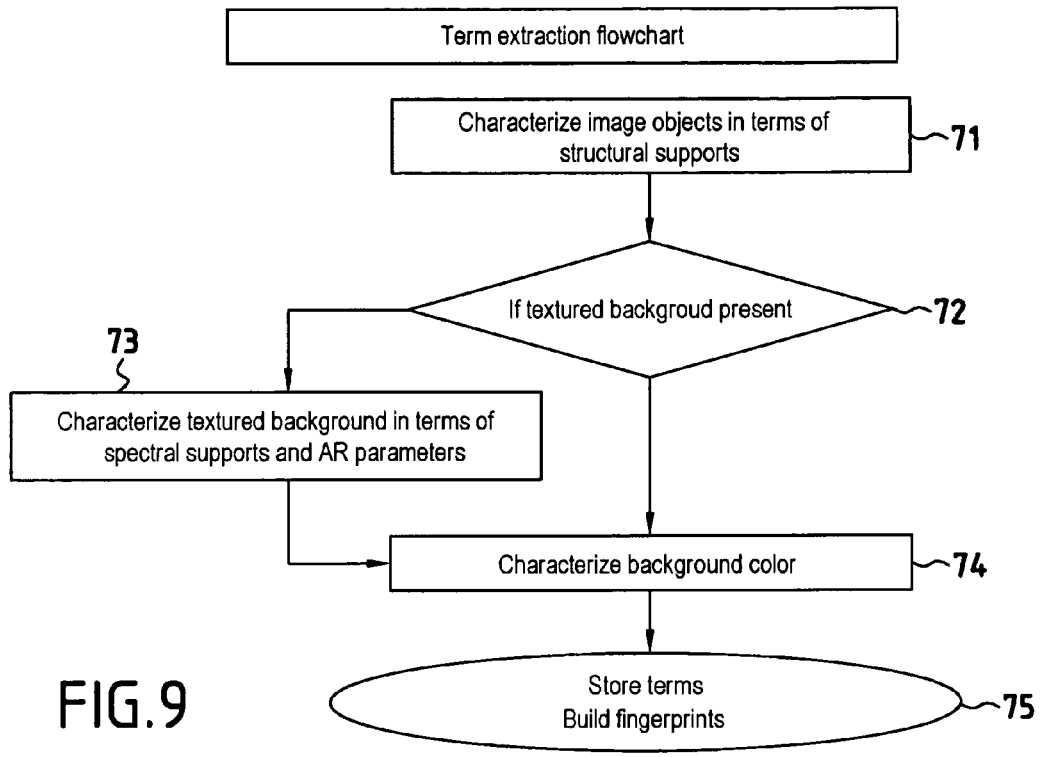
FIG. 9 is a flow chart showing the various steps of extracting terms when processing images.

FIG. 9 shows an example of a flow chart for a process of extracting terms from an image, the process having a first step 71 of characterizing image objects in terms of structural supports, which, where appropriate, may be preceded by a test for detecting structural elements, which test serves to omit the step 71 if there are no structural elements.

Step 72 is a test for determining whether there exists a textured background. If so, the process moves on to step 73 of characterizing the textured background in terms of spectral supports and autoregressive parameters AR, followed by a step 74 of characterizing the background color.

If there is no structured background, then the process moves directly from step 72 to step 74.

Finally, a step 75 lies in storing terms and building up fingerprints.

The description returns in greater detail to characterizing the structural support elements of an image.

The principle on which this characterization is based consists in dismantling boundary zones of image objects into multitudes of small base elements referred to as significant support elements (SSEs) conveying useful information about boundary zones that are made up of linear strips of varying size, or of bends having different curvatures. Statistics about these objects are then analyzed and used for building up the terms of these structural supports.

In order to describe more rigorously the main methods involved in this approach, a digitized image is written as being the set $\{y(i,j), (i,j) \in I \times J\}$, where I and J are respectively the number of rows and the number of columns in the image.

On the basis of previously calculated vertical gradient images $\{g_v(i,j), (i,j) \in I \times J\}$ and horizontal gradient images $\{g_h(i,j), (i,j) \in I \times J\}$, this approach consists in partitioning the image depending on the local orientation of its gradient into a finite number of equidistant classes. The image containing the orientation of the gradient is defined by the following formula:

$$O(i, j) = \arctan\left(\frac{g_h(i, j)}{g_v(i, j)}\right) \quad (1)$$

A partition is no more than an angular decomposition in the two-dimensional (2D) plane (from 0° to 360°) using a well-defined quantization pitch. By using the local orientation of the gradient as a criterion for decomposing boundary zones, it is possible to obtain a better grouping of pixels that form parts of the same boundary zone. In order to solve the problem of boundary points that are shared between two juxtaposed classes, a second partitioning is used, using the same number of classes as before, but offset by half a class. On the basis of these classes coming from the two partitionings, a simple procedure consists in selecting those that have the greatest number of pixels. Each pixel belongs to two classes, each coming from a respective one of the two partitionings. Given that each pixel is potentially an element of an SSE, if any, the procedure opts for the class that contains the greater number of pixels amongst those two classes. This constitutes a region where the probability of finding an SSE of larger size is the greatest possible. At the end of this procedure, only those classes that contain more than 50% of the candidates are retained. These are regions of the support that are liable to contain SSEs.

From these support regions, SSEs are determined and indexed using certain criteria such as the following:

length (for this purpose a threshold length $l_0$ is determined and SSEs that are shorter and longer than the threshold are counted);

intensity, defined as the mean of the modulus of the gradient of the pixels making up each SSE (a threshold written $I_0$ is then defined, and SSEs that are below or above the threshold are indexed); and contrast, defined as the difference between the pixel maximum and the pixel minimum.

At this step in the method, all of the so-called structural elements are known and indexed in compliance with pre-identified types of structural support. They can be extracted from the original image in order to leave room for characterizing the texture field.

Figure 14A:
FIGS. 14a to 14f show respectively an example of an original image, an example of the image after processing taking account of the gradient modulus, and four examples of images processed with dismantling of the boundary zones of the image.
Figure 14B:
Figure 14C:
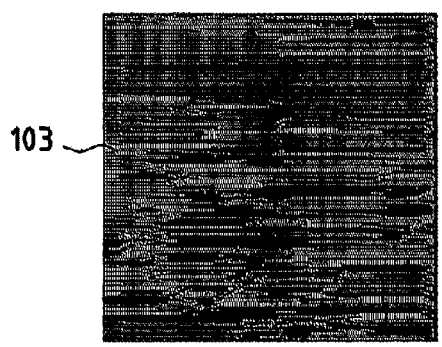
Figure 14D:
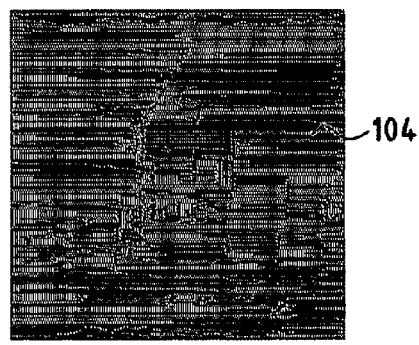
Figure 14E:
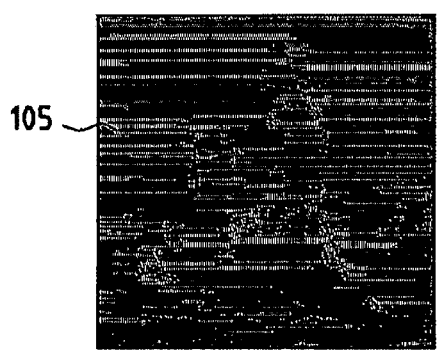
Figure 14F:

By way of example, consider image 81 in FIG. 11, reproduced as image 101 in FIG. 14a, having boundary zones that are shown in image 102 of FIG. 14b. The elements of these boundary zones are then dismantled and, depending on the orientation of their gradients, they are distributed amongst the various classes represented by images 103 to 106 of FIGS. 14c to 14f. These various elements constitute the significant support elements, and a statistical analysis thereof serves to build up the terms of the structural component.

In FIGS. 14c to 14f, by way of example, image 103 corresponds to a class 0 (0°-45°), image 104 corresponds to a class 1 (45°-90°), image 105 corresponds to a class 2 (90°-135°), and image 106 corresponds to a class 3 (135°-180°).

In the absence of structural elements, it is assumed that the image is textured with patterns that are regular to a greater or lesser extent, and the texture field is then characterized. For this purpose, it is possible to decompose the image into three components as follows:

a textural component containing anarchic or random information (such as an image of fine sand or grass) in which no particular arrangement can be determined;

a periodic component (such as a patterned knit) in which repeating dominant patterns are observed; and finally a directional component in which the patterns tend overall towards one or more privileged directions.

Since the idea is to characterize accurately the texture of the image on the basis of a set of parameters, these three components are represented by parametric models.

Figure 10:
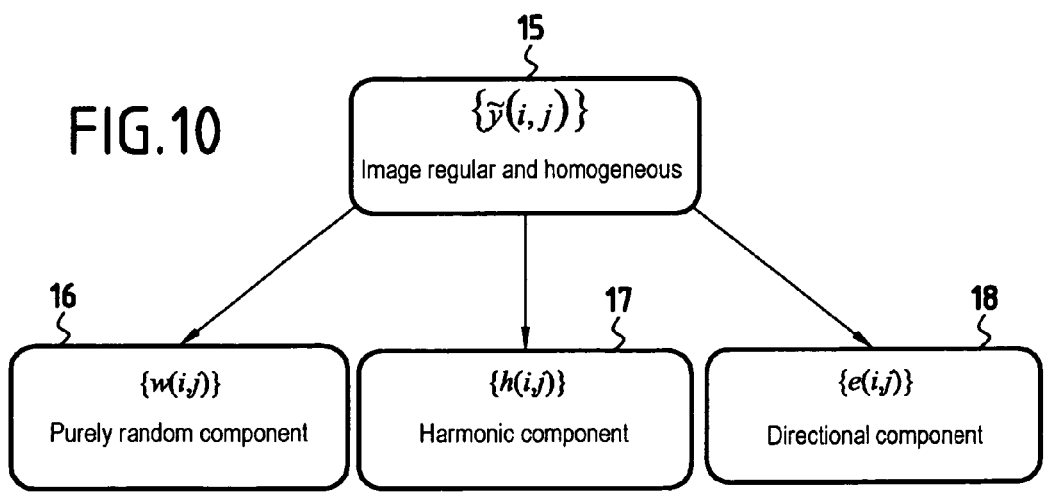
FIG. 10 is a diagram summarizing the process of decomposing an image that is regular and homogeneous.

Thus, the texture of the regular and homogeneous image 15 written $\{\tilde{y}(i,j), (i,j) \in I \times J\}$ is decomposed into three components 16, 17, and 18 as shown in FIG. 10, using the following relationship:

$$\{\tilde{y}(i,j)\} = \{w(i,j)\} + \{h(i,j)\} + \{e(i,j)\}. \quad (16)$$

Where $\{w(i,j)\}$ is the purely random component 16, $\{h(i,j)\}$ is the harmonic component 17, and $\{e(i,j)\}$ is the directional component 18. This step of extracting information from a document is terminated by estimating parameters for these three components 16, 17, and 18. Methods of making such estimates are described in the following paragraphs.

The description begins with an example of a method for detecting and characterizing the directional component of the image.

Initially it consists in applying a parametric model to the directional component $\{e(i,j)\}$. It is constituted by a denumerable sum of directional elements in which each is associated with a pair of integers $(\alpha, \beta)$ defining an orientation of angle $\theta$ such that $\theta = \tan^{-1}\beta/\alpha$. In other words, $e(i,j)$ is defined by:

$$e(i, j) = \sum_{(\alpha,\beta) \in o} e_{(\alpha,\beta)}(i, j)$$

in which each $e_{(\alpha,\beta)}(i,j)$ is defined by:

$$e_{(\alpha,\beta)}(i,j) = \sum_{k=1}^{Ne} \left[ s_k^{\alpha,\beta}(i\alpha - j\beta) \times \cos\left(2\pi \frac{v_k}{\alpha^2 + \beta^2}(i\beta + j\alpha)\right) + t_k^{\alpha,\beta}(i\alpha - j\beta) \times \sin\left(2\pi \frac{v_k}{\alpha^2 + \beta^2}(i\beta + j\alpha)\right) \right] \quad (17)$$

where:

Ne is the number of directional elements associated with $(\alpha, \beta)$;

$v_k$ is the frequency of the $k^{th}$ element; and $\{s_k(i\alpha-j\beta)\}$ and $\{t_k(i\alpha-j\beta)\}$ are the amplitudes.

The directional component $\{e(i,j)\}$ is thus completely defined by knowing the parameters contained in the following vector E:

$$E = \{\alpha_1, \beta_1, \{v_{1k}, s_{1k}(c), t_{1k}(c)\}_{1k=1}^{Ne}\}_{(\alpha_j, \beta_j) \in o} \quad (18)$$

In order to estimate these parameters, use is made of the fact that the directional component of an image is represented in the spectral domain by a set of straight lines of slopes orthogonal to those defined by the pairs of integers $(\alpha_1, \beta_1)$ of the model which are written $(\alpha_1, \beta_1)^{-1}$. These straight lines can be decomposed into subsets of same-slope lines each associated with a directional element.

By way of illustration, FIGS. 15a and 15b show images 84 and 86 each containing one directional element, while FIG. 15c shows an image 88 containing two directional elements.

FIG. 15a1 shows a plot 85 in three dimensions of the spectrum of the image 84 of FIG. 15a.

FIGS. 15b1 and 15c1 are Fourier modulus images 87, 89 associated respectively with the images 86 and 85 of FIGS. 15b and 15c.

In order to calculate the elements of the vector E, it is possible to adopt an approach based on projecting the image in different directions. The method consists initially in making sure that a directional component is present before estimating its parameters.

The directional component of the image is detected on the basis of knowledge about its spectral properties. If the spectrum of the image is considered as being a three-dimensional image (X, Y, Z) in which (X, Y) represent the coordinates of the pixels and Z represents amplitude, then the lines that are to be detected are represented by a set of peaks concentrated along lines of slopes that are defined by the looked-for pairs $(\alpha_1, \beta_1)$ (cf. FIG. 15a1). In order to determine the presence of such lines, it suffices to count the predominant peaks. The number of these peaks provides information about the presence or absence of harmonics or directional supports.

There follows a description of an example of the method of characterizing the directional component. To do this, direction pairs $(\alpha_1, \beta_1)$ are calculated and the number of directional elements is determined.

The method begins with calculating the discrete Fourier transform (DFT) of the image followed by an estimate of the rational slope lines observed in the transformed image $\psi(i,j)$.

To do this, a discrete set of projections is defined subdividing the frequency domain into different projection angles $\theta_k$, where k is finite. This projection set can be obtained in various ways. For example it is possible to search for all pairs of mutually prime integers $(\alpha_k, \beta_k)$ defining an angle $\theta_k$ such that $$\theta_k = \tan^{-1}\frac{\alpha_k}{\beta_k} \text{ where } 0 \leq \theta_k \leq \frac{\pi}{2}.$$

An order r such that $0 \leq \alpha_k, \beta_k \leq r$ serves to control the number of projections. Symmetry properties can then be used for obtaining all pairs up to $2\pi$. These pairs are shown in FIG. 16 for $0 \leq \alpha_k, \beta_k \leq 3$.

The projections of the modulus of the DFT of the image are performed along the angle $\theta_k$. Each projection generates a vector of dimension 1, $V_{(\alpha_k, \beta_k)}$, written $V_k$ to simplify the notation, which contains the looked-for directional information.

Each projection $V_k$ is given by the formula:

$$V_k(i,j) = \sum_\tau \psi(i + \tau\beta_k, j + \tau\alpha_k), \quad (19)$$

$$0 < i + \tau\beta_k < I - 1, \quad 0 < j + \tau\alpha_k < J - 1$$

with $n = -i*\beta_k + j*\alpha_k$ and $0 \leq |n| < N_k$ and $N_k = |\alpha_k|(T-1) + |\beta_k|(L-1)+1$, page 40 where T*L is the size of the image. $\psi(i,j)$ is the modulus of the Fourier transform of the image to be characterized.

For each $V_k$, the high energy elements and their positions in space are selected. These high energy elements are those that present a maximum value relative to a threshold that is calculated depending on the size of the image.

At this stage of the calculation, the number of lines is known. The number of directional components Ne is deduced therefrom by using the simple spectral properties of the directional component of a textured image. These properties are as follows:

1) The lines observed in the spectral domain of a directional component are symmetrical relative to the origin. Consequently, it is possible to reduce the investigation domain to cover only half of the domain under consideration.

2) The maximums retained in the vector are candidates for representing lines belonging to directional elements. On the basis of knowledge of the respective positions of the lines on the modulus of the discrete Fourier transform DFT, it is possible to deduce the exact number of directional elements. The position of the line maximum corresponds to the argument of the maximum of the vector $V_k$, the other lines of the same element being situated every min$\{L,T\}$.

The projection mechanism is shown in FIG. 17 for $(\alpha_k, \beta_k) = (2, -1)$.

After processing the vectors $V_k$ and producing the direction pairs $(\hat{\alpha}_k, \hat{\beta}_k)$, the numbers of lines obtained with each pair are obtained.

It is thus possible to count the total number of directional elements by using the two above-mentioned properties, and the pairs of integers $(\hat{\alpha}_k, \hat{\beta}_k)$ associated with these components are identified, i.e. the directions that are orthogonal to those that have been retained.

For all of these pairs $(\hat{\alpha}_k, \hat{\beta}_k)$, estimating the frequencies of each detected element can be done immediately. If consideration is given solely to the points of the original image along the straight line of equation $i\hat{\alpha}_k - j\hat{\beta}_k = c$, then c is the position of the maximum in Vk, and these points constitute a harmonic one-dimensional signal (1D) of constant amplitude at a frequency $\hat{v}_i^{(\alpha,\beta)}$. It then suffices to estimate the frequency of this 1D signal by a conventional method (locating the maximum value on the 1D DFT of this new signal).

To summarize, it is possible to implement the method comprising the following steps:

Determining the maximum of each projection.

The maximums are filtered so as to retain only those that are greater than a threshold.

For each maximum $m_i$ corresponding to a pair $(\hat{\alpha}_k, \hat{\beta}_k)$.

The number of lines associated with said pair is determined from the above-described properties.

The frequency associated with $(\hat{\alpha}_k, \hat{\beta}_k)$ is calculated, corresponding to the intersection of the horizontal axis and the maximum line (corresponding to the maximum of the retained projection).

There follows a description of how the amplitudes $\{\hat{s}_k^{(\alpha,\beta)}(t)\}$ and $\{\hat{t}_k^{(\alpha,\beta)}(t)\}$ are calculated, which are the other parameters contained in the above-mentioned vector E.

Given the direction $(\hat{\alpha}_k, \hat{\beta}_k)$ and the frequency $V_k$, it is possible to determine the amplitudes $\hat{s}_k^{(\alpha,\beta)}(c)$ and $\hat{t}_k^{(\alpha,\beta)}(c)$, for c satisfying the formula $i\hat{\alpha}_k - j\hat{\beta}_k = c$, using a demodulation method. $\hat{s}_k^{(\alpha,\beta)}(c)$ is equal to the mean of the pixels along the straight line of equation $i\hat{\alpha}_k - j\hat{\beta}_k = c$ of the new image that is obtained by multiplying $\tilde{y}(i,j)$ by:

$$\cos\left(\frac{\hat{v}_k^{(\alpha,\beta)}}{\hat{\alpha}_k^2 + \hat{\beta}_k^2}(i\hat{\beta}_k + j\hat{\alpha}_k)\right)$$

This can be written as follows:

$$\hat{s}_k^{(\alpha,\beta)}(c) \cong \frac{1}{N_s} \sum_{i\hat{\alpha}-j\hat{\beta}=c} \tilde{y}(i,j) \cos\left(\frac{\hat{v}_k^{(\alpha,\beta)}}{\hat{\alpha}_k^2 + \hat{\beta}_k^2}(i\hat{\beta}_k + j\hat{\alpha}_k)\right) \quad (20)$$

where $N_s$ is the number of elements in this new signal.

Similarly, $\hat{t}_k^{(\alpha,\beta)}(c)$ can be obtained by applying the equation:

$$\hat{t}_k^{(\alpha,\beta)}(c) \cong \frac{1}{N_s} \sum_{i\hat{\alpha}-j\hat{\beta}=c} \tilde{y}(i,j) \sin\left(\frac{\hat{v}_k^{(\alpha,\beta)}}{\hat{\alpha}_k^2 + \hat{\beta}_k^2}(i\hat{\beta}_k + j\hat{\alpha}_k)\right) \quad (21)$$

The above-described method can be summarized by the following steps:

For every directional element $(\hat{\alpha}_k, \hat{\beta}_k)$, do

For every line (d), calculate

1) The mean of the points (i,j) weighted by:

$$\cos\left(\frac{\hat{v}_k^{(\alpha,\beta)}}{\hat{\alpha}_k^2 + \hat{\beta}_k^2}(i\hat{\beta}_k + j\hat{\alpha}_k)\right)$$

This mean corresponds to the estimated amplitude $\hat{s}_k^{(\alpha,\beta)}(d)$.

2) The mean of the points (i,j) weighted by:

$$\sin\left(\frac{\hat{v}_k^{(\alpha,\beta)}}{\hat{\alpha}_k^2 + \hat{\beta}_k^2}(i\hat{\beta}_k + j\hat{\alpha}_k)\right)$$

This mean corresponds to the estimated amplitude $\hat{t}_k^{(\alpha,\beta)}(d)$.

Table 3 below summarizes the main steps in the projection method.

TABLE 3

Step 1. Calculate the set of projection pairs $(\alpha_k, \beta_k) \in P_r$.
Step 2. Calculate the modulus of the DFT of the image $\tilde{y}(i,j): \psi(\omega, v) = |DFT(y(i,j))|$
Step 3. For every $(\alpha_k, \beta_k) \in P_r$, calculate the vector $V_k$: the projection of $\psi(w, v)$ along $(\alpha_k, \beta_k)$ using equation (19).
Step 4: Detecting lines:
For every $(\alpha_k, \beta_k) \in P_r$, determine: $M_k = \max_j \{V_k(j)\}$;

calculate $n_k$, the number of pixels of significant value encountered along the projection
save $n_k$ and $j_{max}$ the index of the maximum in $V_k$
select the directions that satisfy the criterion:

$$\frac{M_k}{n_k} > s_e$$

where $s_e$ is a threshold to be defined, depending on the size of the image.
The directions that are retained are considered as being the directions of the looked-for lines.
Step 5. Save the looked-for pairs $(\hat{\alpha}_k, \hat{\beta}_k)$ which are the orthogonals of the pairs $(\alpha_k, \beta_k)$ retained in step 4.

There follows a description of detecting and characterizing periodic textural information in an image, as contained in the harmonic component $\{h(i,j)\}$. This component can be represented as a finite sum of 2D sinewaves:

$$h(i,j) = \sum_{p=1}^{P} C_p \cos 2\pi(i\omega_p + jv_p) + D_p \sin 2\pi(i\omega_p + jv_p), \quad (22)$$

where:

$c_p$ and $D_p$ are amplitudes;

$(\omega_p, v_p)$ is the $p^{th}$ spatial frequency.

FIG. 18a1 shows an image 91 containing periodic components, and FIG. 18b1 is a synthesized image containing one periodic component.

FIG. 18a2 shows an image 92 which is an image of the modulus of the DFT presenting a set of peaks.

FIG. 18b2 is a 3D view 94 of the DFT which shows the presence of a symmetrical pair of peaks 95, 96.

In the spectral domain, the harmonic component thus appears as a pair of isolated peaks that are symmetrical about the origin (cf. FIG. 18(a2)-(b2)). This component reflects the existence of periodicities in the image.

The information that is to be determined is constituted by the elements of the vector:

$$H = \{P, \{C_p, D_p, \omega_p, v_p\}_{p=1}^{P}\} \quad (23)$$

For this purpose, the procedure begins by detecting the presence of said periodic component in the image of the modulus of the Fourier transform, after which its parameters are estimated.

Detecting the periodic component consists in determining the presence of isolated peaks in the image of the modulus of the DFT. The procedure is the same as when determining the directional components. From the method described in Table 1, if the value $n_k$ obtained during stage 4 of the method described in Table 1 is less than a threshold, then isolated peaks are present that characterize the presence of a harmonic component, rather than peaks that form a continuous line.

Characterizing the periodic component amounts to locating the isolated peaks in the image of the modulus of the DFT.

These spatial frequencies $(\hat{\omega}_p, \hat{v}_p)$ correspond to the positions of said peaks:

$$(\hat{\omega}_p, \hat{v}_p) \underset{(\omega,v)}{\mathrm{argmax}} \Psi(\omega, v) \quad (24)$$

In order to calculate the amplitudes $(\hat{C}_p, \hat{D}_p)$ a demodulation method is used as for estimating the amplitudes of the directional component.

For each periodic element of frequency $(\hat{\omega}_p, \hat{v}_p)$, the corresponding amplitude is identical to the mean of the pixels of the new image obtained by multiplying the image $\{\tilde{y}(i,j)\}$ by $\cos(i\hat{\omega}_p + j\hat{v}_p)$. This is represented by the following equations:

$$\hat{C}_p = \frac{1}{L \times T} \sum_{n=0}^{L-1} \sum_{m=0}^{T-1} y(n,m)\cos(n\hat{\omega}_p + m\hat{v}_p) \quad (25)$$

$$\hat{D}_p = \frac{1}{L \times T} \sum_{n=0}^{L-1} \sum_{m=0}^{T-1} y(n,m)\cos(n\hat{\omega}_p + m\hat{v}_p) \quad (26)$$

To sum up, a method of estimating the periodic component comprises the following steps:

--- step 1. Locate the isolated peaks in the second half of the image of the modulus of the Fourier transform and count the number of peaks.
step 2. For each detected peak:
calculate its frequency using equation (24);
calculate its amplitude using equations (25-26).

---

The last information to be extracted is contained in the purely random component $\{w(i,j)\}$. This component may be represented by a 2D autoregressive model of the non-symmetrical half-plane support (NSHP) defined by the following difference equation:

$$w(i,j) = -\sum_{(k,l) \in S_{N,M}} a_{k,l} w(i-k, j-l) + u(i,j) \quad (27)$$

where $\{a_{(k,l)}\}_{(k,l) \in S_{N,M}}$ are the parameters to be determined for every (k,l) belong to:

$$S_{N,M} = \{(k,l)/k=0, 1 \leq l \leq M\} \cup \{(k,l)/1 \leq k \leq N, -M \leq l \leq M\}$$

The pair (N,M) is known as the order of the model $\{u(i,j)\}$ is Gaussian white noise of finite variance $\sigma_u^2$.

The parameters of the model are given by:

$$W = \left\{(N, M), \sigma_u^2, \{a_{k,l}\}_{(k,l) \in S_{N,M}}\right\} \quad (28)$$

The methods of estimating the elements of W are numerous, such as for example the 2D Levinson algorithm for adaptive methods of the least squares type (LS).

There follows a description of a method of characterizing the color of an image from which it is desired to extract terms $t_i$ representing iconic characteristics of the image, where color is a particular example of characteristics that can comprise other characteristics such as algebraic or geometrical moments, statistical properties, or the spectral properties of pseudo-Zernicke moments.

The method is based on perceptual characterization of color. Firstly, the color components of the image are transformed from red, green, blue (RGB) space to hue, saturation, value (HSV) space. This produces three components: hue, saturation, value. On the basis of these three components, N colors or iconic components of the image are determined. Each iconic component Ci is represented by a vector of M values. These values represent the angular and annular distribution of points representing each component, and also the number of points of the component in question.

The method developed is shown in FIG. 19 using, by way of example, N=16 and M=17.

In a first main step 110, starting from an image 111 in RGB space, the image 111 is transformed from RGB space into HSV space (step 112) in order to obtain an image in HSV space.

The HSV model can be defined as follows.

Hue (H): varies over the range [0 360], where each angle represents a hue.

Saturation (S); varies over the range [0 1], measuring the purity of colors, thus serving to distinguish between colors that are "vivid", "pastel", or "faded".

Value (V): takes values in the range [0 1], indicates the lightness or darkness of a color and the extent to which it is close to white or black.

The HSV model is a non-linear transformation of the RGB model. The human eye can distinguish 128 hues, 130 saturations, and 23 shades.

For white, V=1 and S=0, black has a value V=0, and hue and saturation H and S are undetermined. When V=1 and S=1, then the color is pure.

Each color is obtained by adding black or white to the pure color.

In order to have colors that are lighter, S is reduced while maintaining H and V, and in contrast in order to have colors that are darker, black is added by reducing V while leaving H and S unchanged.

Going from the color image expressed in RGB coordinates to an image expressed in HSV space, is performed as follows:

For every point of coordinates (i,j) and of value $(R_k, G_k, B_k)$ produce a point of coordinates (i,j) and of value $(H_k, S_k, V_k)$, with:

$$V_k = \max(R_k, B_k, G_k)$$

$$S_k = \frac{V_k - \min(R_k, G_k, B_k)}{V_k}$$

$$H_k = \begin{cases} \dfrac{G_k - B_k}{V_k - \min(R_k, G_k, B_k)} & \text{if } V_k \text{ is equal to } R_k \\ 2 + \dfrac{B_k - R_k}{V_k - \min(R_k, G_k, B_k)} & \text{if } V_k \text{ is equal to } G_k \\ 4 + \dfrac{R_k - G_k}{V_k - \min(R_k, G_k, B_k)} & \text{if } V_k \text{ is equal to } B_k \end{cases}$$

Thereafter, the HSV space is partitioned (step 113).

N colors are defined from the values given to hue, saturation, and value. When N equals 16, then the colors are as follows: black, white, pale gray, dark gray, medium gray, red, pink, orange, brown, olive, yellow, green, sky blue, blue green, blue, purple, magenta.

For each pixel, the color to which it belongs is determined. Thereafter, the number of points having each color is calculated.

In a second main step 120, the partitions obtained during the first main step 110 are characterized.

In this step 120, an attempt is made to characterize each previously obtained partition Ci. A partition is defined by its iconic component and by the coordinates of the pixels that make it up. The description of a partition is based on characterizing the spatial distribution of its pixels (cloud of points). The method begins by calculating the center of gravity, the major axis of the cloud of points, and the axis perpendicular thereto. This new index is used as a reference in decomposing the partition Ci into a plurality of sub-partitions that are represented by the percentage of points making up each of the sub-partitions. The process of characterizing a partition Ci is as follows:

calculating the center of gravity and the orientation angle of the components Ci defining the partitioning index;

calculating the angular distribution of the points of the partition Ci in the N directions operating counterclockwise, in N sub-partitions defined as follows:

$$\left(0°, \frac{360}{N}, \frac{2 \times 360}{N}, \ldots, \frac{i \times 360}{N}, \ldots, \frac{(N-1) \times 360}{N}\right)$$

partitioning the image space into squares of concentric radii, and calculating on each radius the number of points corresponding to each iconic component.

The characteristic vector is obtained from the number of points of each distribution of color Ci, the number of points in the 8 angular sub-distributions, and the number of image points.

Thus, the characteristic vector is represented by 17 values in this example.

FIG. 19 shows the second step 120 of processing on the basis of iconic components C0 to C15 showing for the components C0 (module 121) and C1 (module 131), the various steps undertaken, i.e. angular partitioning 122, 132 leading to a number of points in the eight orientations under consideration (step 123, 133), and annular partitioning 124, 134 leading to a number of points on the eight radii under consideration (step 125, 135), and also taking account of the number of pixels of the component (C0 or C15 as appropriate) in the image (step 126 or step 136).

Steps 123, 125, and 126 produce 17 values for the component C0 (step 127) and steps 133, 135, and 136 produce 17 values for the component C15 (step 137).

Naturally, the process is analogous for the other components C1 to C14.

FIGS. 20 and 21 show the fact that the above-described process is invariant in rotation.

Thus, in the example of FIG. 20, the image is partitioned in two subsets, one containing crosses X and the other circles O. After calculating the center of gravity and the orientation angle θ, an orientation index is obtained that enables four angular sub-divisions (0°, 90°, 180°, 270°) to be obtained.

Thereafter, an annular distribution is performed, with the numbers of points on a radius equal to 1 and then on a radius equal to 2 being calculated. This produces the vector V0 characteristic of the image of FIG. 20: 19; 6; 5; 4; 4; 8; 11.

The image of FIG. 21 is obtained by turning the image of FIG. 20 through 90°. By applying the above method to the image of FIG. 21, a vector V1 is obtained characterizing the image and demonstrating that the rotation has no influence on the characteristic vector. This makes it possible to conclude that the method is invariant in rotation.

As mentioned above, methods making it possible to obtain for each image the terms representing the dominant colors, the textural properties, or the structures of the dominant zones of the image, can be applied equally well to the entire image or to portions of the image.

There follows a brief description of the process whereby a document can be segmented in order to produce image portions for characterizing.

In a first possible technique, static decomposition is performed. The image is decomposed into blocks with or without overlapping.

In a second possible technique, dynamic decomposition is performed. Under such circumstances, the image is decomposed into portions as a function of the content of the image.

In a first example of the dynamic decomposition technique, the portions are produced from germs constituted by singularity points in the image (points of inflection). The germs are calculated initially, and they are subsequently fused so that only a small number remain, and finally the image points are fused with the germs having the same visual properties (statistics) in order to produce the portions or the segments of the image to be characterized.

In another technique that relies on hierarchical segmentation, the image points are fused to form n first classes. Thereafter, the points of each of the classes are decomposed into m classes and so on until the desired number of classes is reached. During fusion, points are allocated to the nearest class. A class is represented by its center of gravity and/or a boundary (a surrounding box, a segment, a curve, ... ).

The main steps of a method of characterizing the shapes of an image are described below.

Shape characterization is performed in a plurality of steps:

To eliminate a zoom effect or variation due to movement of non-rigid elements in an image (movement of lips, leaves on a tree, ... ), the image is subjected to multiresolution followed by decimation.

To reduce the effect of shifting in translation, the image or image portion is represented by its Fourier transform.

To reduce the zoom effect, the image is defined in polar logarithmic space.

The following steps can be implemented:

a) multiresolution f=wavelet(I,n); where I is the starting image and n is the number of decompositions;

b) projection of the image into logPolar space:

$g(l,m) = f(i,j)$ with $i = l*\cos(m)$ and $j = l*\sin(m)$;

c) calculating the Fourier transform of g: $H=FFT(g)$;
d) characterizing H;
d1) projecting H in a plurality of directions (0, 45, 90, . . . ): the result is a set of vectors of dimension equal to the dimension of the projection segment;
d2) calculating the statistical properties of each projection vector (mean, variance, moments).

The term representing shape is constituted by the values of the statistical properties of each projection vector.

The invention claimed is:

1. A method of indexing multimedia documents, the method being characterized in that it comprises the following steps:
   a) for each multimedia document, identifying and extracting terms $t_i$ constituted by vectors characterizing properties of each of the multimedia documents for indexing, which characterizing properties include at least one of shape, texture, color, and structure of an image, an energy level, an oscillation rate or frequency information of an audio signal, and a group of characters of a text;
   b) storing the terms $t_i$ characterizing the properties of each of the multimedia documents in a term base comprising a set of P terms, where P is an integer;
   c) determining a maximum number (N) of desired concepts combining pertinent terms $t_i$, where N is an integer less than P, with each concept $c_i$ being designed to combine all terms $t_i$ based on a relationship of their characterizing properties;
   d) calculating a matrix T of distances between the terms $t_i$ of the term base of P terms;
   e) decomposing the set of P terms into N portions $P_j$ ($1 \leq j \leq N$) such that the set of P terms $=P_1 \cup P_2 \ldots \cup P_j \ldots \cup P_N$, each portion $P_j$ comprising a set of terms $t_{ij}$ and being represented by a concept $c_j$, the terms $t_i$ being distributed in such a manner that terms that are farther away are to be found in distinct portions $P_l$, $P_m$ while terms that are closer together are to be found in the same portion $P_l$;
   f) structuring a concept dictionary so as to constitute a binary tree in which each leaf of the binary tree contains a concept $c_i$ of the dictionary and each node of the binary tree contains information necessary for scanning the tree during a stage of identifying a multimedia document by comparing it with previously-indexed documents; and
   g) constructing a fingerprint base made up of a set C of concepts $c_i$ representing the terms $t_i$ of the multimedia documents to be indexed, each multimedia document being associated with a fingerprint that is specific thereto.

2. A method of indexing multimedia documents according to claim 1, characterized in that each concept $c_i$ of the fingerprint base is associated with a data set comprising a number of terms, in T, in the multimedia documents in which said concept $c_i$ is present.

3. A method of indexing multimedia documents according to claim 1, characterized in that for each multimedia document having a corresponding concept $c_i$, a fingerprint of the corresponding concept $c_i$ is registered in the multimedia document, said fingerprint containing at least one of a frequency of occurrence of the corresponding concept $c_i$ identities of concepts neighboring the corresponding concept $c_i$ in the multimedia document, and a score which is a mean value of similarity measurements between the corresponding concept $c_i$ and the terms $t_i$ of the multimedia document that are most proximate to the corresponding concept $c_i$.

4. A method of indexing multimedia documents according to claim 1, further comprising:
   optimizing the step of decomposing the set of P terms of the term base by decomposing said set of P terms into M classes $C_i$ (in which $1 \leq i \leq M$, where M is an integer and $M \leq P$), so as to reduce a distribution error of the set of P terms in the term base into N portions ($P_1, P_2, \ldots, P_N$) where each portion $P_i$ is represented by the terms $t_i$ that are taken as the concept $c_i$,
   the distribution error that is committed ($\in$) being such that:

$$\varepsilon = \sum_{i=1}^{N} \varepsilon_{t_i},$$

wherein $$\varepsilon_{t_i} = \sum_{t_j \in P_i} d^2(t_i, t_j)$$

is the distribution error committed by replacing the terms $t_j$ of a portion $P_i$ with the terms $t_i$.

5. A method of indexing multimedia documents according to claim 4, characterized in that it comprises the following steps:
   i) decomposing the set of P terms into two portions ($P_1$ and $P_2$);
   ii) determining a first term $t_i$ and a second term $t_j$ of the set of P terms that are farthest apart, corresponding to a greatest distance $D_{ij}$ of the matrix T of distances;
   iii) for each term $t_k$ of the set of P terms, examining to see whether a distance $D_{ki}$ between the term $t_k$ and the first term $t_i$ is less that a distance $D_{kj}$ between the term $t_k$ and the second term $t_j$, and if so, allocating the term $t_k$ to the portion $P_1$, and otherwise allocating the term $t_k$ to the portion $P_2$; and
   iv) iterating step (i) until a desired number N of portions $P_i$ has been obtained, and on each iteration applying the steps (ii) and (iii) on the first and second terms of the portions $P_1$ and $P_2$.

6. A method of indexing multimedia documents according to claim 4, further comprising:
   optimization starting from N disjoint portions $\{P_1, P_2, \ldots, P_N\}$ of the set of P terms and N terms $\{t_1, t_2, \ldots, t_N\}$ representing them in order to reduce a decomposition error of the set of P terms into N portions, further comprising:
   i) calculating a corresponding center of gravity $C_i$ for each portion $P_i$;
   ii) calculating a corresponding decomposition error using:

$$\varepsilon C_i = \sum_{t_j \in P_i} d^2(C_i, t_j),$$

replacing the terms $t_j$ by center of gravity terms $C_i$; and calculating a corresponding distribution error using:

$$\varepsilon t_i = \sum_{t_j \in P_i} d^2(t_i, t_j)$$

by replacing the terms $t_j$ by the terms $t_i$;

iii) comparing ∈$t_i$ and ∈$C_i$ and replacing the terms $t_i$ by the center of gravity terms $C_i$ if ∈$C_i$≦∈$t_i$; and iv) calculating a new distance matrix T between the terms $t_i$ of the term base and decomposing the set of P terms of the term base into N portions, unless a stop condition is satisfied with $$\frac{\varepsilon c_t - \varepsilon c_{t+1}}{\varepsilon c_t} < threshold,$$

where ∈$c_t$ represents the decomposition error committed at instant t.

7. A method of indexing multimedia documents according to claim 1, wherein structuring the concept dictionary includes:

producing a navigation chart iteratively on each iteration, by splitting the set C of concepts into two subsets, and then selecting one subset on each iteration until a desired number of groups is obtained or until a stop criterion is satisfied.

8. A method of indexing multimedia documents according to claim 7, wherein the stop criterion is satisfied when each of the two subsets obtained is homogeneous and has a small standard deviation.

9. A method of indexing multimedia documents according to claim 7, wherein structuring the concept dictionary includes:

determining navigation indicators from a matrix M=[$c_1$, $c_2$, . . . , $c_N$] ∈ $\Re^{p*N}$—of the set C of concepts $c_i$ ∈ $\Re^p$ where $c_i$ represents a concept of p values, by implementing the following steps:

i) calculating a representative w of the matrix M;

ii) calculating a covariance matrix M̄ between elements of the matrix M and the representative w of the matrix M;

iii) calculating a projection axis u for projecting the elements of the matrix M;

iv) calculating a value pi=d(u,Ci)−d(u,w) and decomposing the set C of concepts into two subsets (C1 and C2) as follows:

$$\begin{cases} c_i \in C1 \text{ if } pi \leq 0 \\ c_i \in C2 \text{ if } pi > 0 \end{cases}$$

v) storing a data set {u, w, |p1|, p2} in a node associated with the set C of concepts, where p1 is a maximum of all pi≦0 and p2 is a minimum of all pi>0, the data set {u, w, |p1|, p2} constituting the navigation indicators in the concept dictionary.

10. A method of indexing multimedia documents according to claim 1, characterized in that structural components and complements of said structural components constituted by textural components of the image of the multimedia document are analyzed, and in that:

a) while analyzing the structural components of the image:

a1) boundary zones of image structures are distributed into different classes depending on an orientation of a local variation in intensity so as to define structural support elements (SSEs) of the image; and a2) performing statistical analysis to construct terms constituted by vectors describing local properties and global properties of the structural support elements;

b) while analyzing the textural components of the image:

b1) detecting and performing parametric characterization of a purely random component of the image;

b2) detecting and performing parametric characterization of a periodic component of the image; and b3) detecting and performing parametric characterization of a directional component of the image;

c) grouping a set of descriptive elements of the image in a limited number of concepts constituted firstly by terms describing the local properties and the global properties of structural support element and secondly by parameters of the parametric characterizations of the random, periodic, and directional components defining the textural components of the image; and d) for each document, defining a fingerprint from occurrences, positions, and frequencies of said limited number of concepts.

11. A method of indexing multimedia documents according to claim 10, characterized in that the local properties of the structural support elements taken into consideration for constructing terms comprise at least one of a linear strip or a curved arc as a support, length and width dimensions of the support, a main direction of the support, and a shape and statistical properties of pixels constituting the support.

12. A method of indexing multimedia documents according to claim 10, characterized in that the global properties of the structural support element taken into account for constructing terms comprise at least a number of each type of support and a spatial disposition thereof.

13. A method of indexing multimedia documents according to claim 10, wherein during analysis of the structural components of the image, a prior test is performed to detect whether at least one structure is present in the image, and in the absence of any structure, the method passes directly to the step of analyzing the textural components of the image.

14. A method of indexing multimedia documents according to claim 10, characterized in that in order to distribute boundary zones of the image structures into different classes, starting from a digitized image defined by a set of pixels y(i,j) where (i,j) ∈ I×J, where I and J designate, respectively, a number of rows and a number of columns of the image, a vertical gradient image $g_v(i,j)$ where (i,j) ∈ I×J, and a horizontal gradient image $g_h(i,j)$ with (i,j) ∈ I×J are calculated, and the image is partitioned depending on a local orientation of its gradient into a finite number of equidistant classes, the image containing the local orientation of its gradient being defined by the equation:

$$O(i, j) = \arctan\left[\frac{gh(i, j)}{gv, (i, j)}\right]$$

the classes constituting support regions likely to contain significant support elements are identified, and based on the support regions, significant support elements are determined and indexed using predetermined criteria.

15. A method of indexing multimedia documents according to claim 1, characterized in that while indexing a multimedia document comprising video signals, terms $t_i$ are selected that are constituted by key-images representing groups of consecutive homogeneous images, and concepts $c_i$ are determined by grouping together terms $t_i$.

16. A method of indexing multimedia documents according to claim 15, characterized in that in order to determine key-images constituting terms $t_i$, a score vector SV is initially generated comprising a set of elements SV(i) representative of a difference or similarity between a first content of an image of index i and a second content of an image of index i−1, and the score vector SV is analyzed in order to determine key-images which correspond to maximums of values of the set of elements SV(i) of the score vector SV.

17. A method of indexing multimedia documents according to claim 16, characterized in that an image of index j is considered as being a key-image if:
   a value SV(j) of a corresponding element of the score vector SV is a maximum and the value SV(j) is situated between two minimums minL and minR, and
   a minimum M1 given by $$M1 = (|SV_{(j)} - minL|, |SV_{(j)} - minR|)$$

is greater than a given threshold.

18. A method of indexing multimedia documents according to claim 1, characterized in that while indexing a multimedia document comprising audio components, the multimedia document is sampled and decomposed into frames, which frames are further grouped together into clips that are each characterized by terms $t_i$ constituted by a parameter vector.

19. A method of indexing multimedia documents according to claim 18, characterized in that each frame comprises about 512 samples to about 2,048 samples of a sampled audio document.

20. A method of indexing multimedia documents according to claim 18, characterized in that the parameters taken into account to define the terms $t_i$ comprise time information selected from the group consisting of: an energy level of audio signal frames, a standard deviation of frame energy levels in the clips, a sound variation ratio, a low energy ratio, a rate of oscillation about a predetermined value, a high rate of oscillation about a predetermined value, a difference between a number of oscillation rates above and below the mean oscillation rate for the frames of the clips, a variance of the oscillation rate, or a ratio of silent frames.

21. A method of indexing multimedia documents according to claim 18, characterized in that the parameters taken into account for defining the terms $t_i$ comprise frequency information selected from the group consisting of:
   a center of gravity of a frequency spectrum of a short Fourier transform of an audio signal, a bandwidth of the audio signal, a ratio between an energy level in a frequency band to a total energy level in the frequency band of the sampled audio signal, a mean value of spectrum variation of two adjacent frames in a clip, and a cutoff frequency of a clip.

22. A method of indexing multimedia documents according to claim 18, characterized in that the parameters taken into account for defining the terms $t_i$ comprise at least energy modulation at 4 Hz.

23. A method of indexing multimedia documents according to claim 1, characterized in that the shape of the image of the multimedia document are analyzed using the following steps:
   a) performing multiresolution followed by decimation of the image;
   b) defining the image in polar logarithmic space;
   c) representing a query image or an image portion by its Fourier transform H;
   d) characterizing the Fourier transform H as follows:
      d1) projecting H in a plurality of directions to obtain a set of vectors of dimension equal to a projection movement dimension; and
      d2) calculating statistical properties of each projection vector; and
   e) representing the shape of the image by a term constituted by values for the statistical properties of each projection vector.

* * * * *

UNITED STATES PATENT AND TRADEMARK OFFICE
CERTIFICATE OF CORRECTION

PATENT NO. : 7,552,120 B2  
APPLICATION NO. : 10/580747  
DATED : June 23, 2009  
INVENTOR(S) : Hassane Essafi et al.

It is certified that error appears in the above-identified patent and that said Letters Patent is hereby corrected as shown below:

Column 27, line 39, Equation 25, reads:

$$\hat{C}_p = \frac{1}{L \times T} \sum_{n=0}^{L-1} \sum_{m=0}^{r-1} y(n,m) \cos(n\hat{\omega}_p + m\hat{v}_p) \quad (25)$$

should read $$\hat{C}_p = \frac{1}{L \times T} \sum_{n=0}^{L-1} \sum_{m=0}^{T-1} y(n,m) \cos(n\hat{\omega}_p + m\hat{v}_p) \quad (25)$$

--;

Column 27, line 42, Equation 26, reads:

$$\hat{D}_p = \frac{1}{L \times T} \sum_{n=0}^{L-1} \sum_{m=0}^{r-1} y(n,m) \cos(n\hat{\omega}_p + m\hat{v}_p) \quad (26)$$

should read $$\hat{D}_p = \frac{1}{L \times T} \sum_{n=0}^{L-1} \sum_{m=0}^{T-1} y(n,m) \cos(n\hat{\omega}_p + m\hat{v}_p) \quad (26)$$

--; and

Column 30, line 16, "FIG. 20: 19; 6; 5; 4; 4; 8; 11." should read --FIG. 20: 19; 6; 5; 4; 4; 8; 11.--.

Signed and Sealed this

Thirtieth Day of November, 2010

David J. Kappos  
*Director of the United States Patent and Trademark Office*